(12) United States Patent
Matsumura et al.

(10) Patent No.: US 10,999,763 B2
(45) Date of Patent: May 4, 2021

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/312,563

(22) PCT Filed: Jun. 22, 2017

(86) PCT No.: PCT/JP2017/022963
§ 371 (c)(1),
(2) Date: Dec. 21, 2018

(87) PCT Pub. No.: WO2018/003646
PCT Pub. Date: Jan. 4, 2018

(65) Prior Publication Data
US 2019/0261219 A1    Aug. 22, 2019

(30) Foreign Application Priority Data

Jun. 27, 2016 (JP) .............................. JP2016-127072

(51) Int. Cl.
*H04W 28/06* (2009.01)
*H04W 72/12* (2009.01)
(Continued)

(52) U.S. Cl.
CPC ........... *H04W 28/06* (2013.01); *H04L 5/0053* (2013.01); *H04W 28/04* (2013.01); *H04W 72/02* (2013.01); *H04W 72/04* (2013.01); *H04W 72/0446* (2013.01); *H04W 72/1268* (2013.01); *H04W 88/02* (2013.01)

(58) Field of Classification Search
CPC ... H04L 5/0055; H04L 1/0026; H04L 1/1854; H04L 1/1864; H04L 1/1887;
(Continued)

(56) References Cited

U.S. PATENT DOCUMENTS

2016/0352551 A1* 12/2016 Zhang ................... H04L 5/0007

OTHER PUBLICATIONS

Fujitsu "TDD frame structure with mixed numerology", 3GPP TSG RAN WG1 Meeting #85 , R1-164331, Nanjing, China May 23-27, 2016. (Year: 2016).*
(Continued)

*Primary Examiner* — Awet Haile
(74) *Attorney, Agent, or Firm* — Osha Bergman Watanabe & Burton LLP

(57) ABSTRACT

The present invention is designed so that, when a plurality of user terminals with different numerologies are multiplexed in the same carrier, the effect of latency reduction can be achieved effectively. According to the present invention, a user terminal has a receiving section that receives a downlink (DL) signal in a carrier in which a plurality of user terminals with different numerologies are multiplexed, a transmission section that transmits the retransmission control information of the DL signal, and a control section that configures a retransmission control subframe based on the same numerology among the plurality of user terminals, and controls transmission of the retransmission control information in the retransmission control subframes.

9 Claims, 27 Drawing Sheets

(51) Int. Cl.
*H04W 72/04* (2009.01)
*H04L 5/00* (2006.01)
*H04W 72/02* (2009.01)
*H04W 28/04* (2009.01)
*H04W 88/02* (2009.01)

(58) Field of Classification Search
CPC ... H04L 1/1896; H04L 5/0007; H04L 5/0064; H04L 5/0082; H04L 5/0091
See application file for complete search history.

(56) References Cited

OTHER PUBLICATIONS

Huawei "Discussion on frame structure for NR" 3GPP TSG RAN WG1 Meeting #85, R1-164032, Nanjing, China, May 23-27, 2016. (Year: 2016).*

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
International Search Report issued for PCT/JP2017/022963, dated Aug. 22, 2017 (4 pages).
Written Opinion issued for PCT/JP2017/022963, dated Aug. 22, 2017 (3 pages).
3GPP TSG RAN WG1 Meeting #85; R1-164331 "TDD frame structure with mixed numerology" Fujitsu; Nanjing, China; May 23-27, 2016 (5 pages).
3GPP TSG RAN WG1 Meeting #85; R1-164032 "Discussion on frame structure for NR" Huawei, HiSilicon; Nanjing, China; May 23-27, 2016 (8 pages).
Extended European Search Report issued in European Application No. 17820005.1, dated Jan. 24, 2020 (8 pages).

* cited by examiner

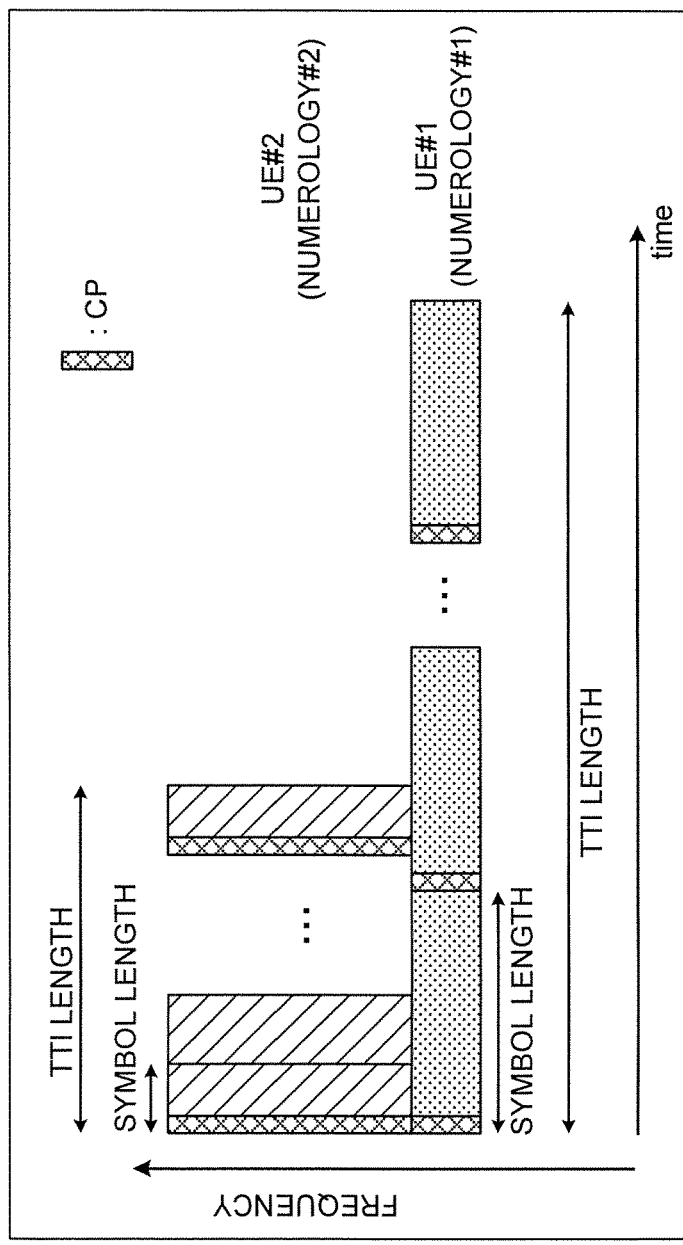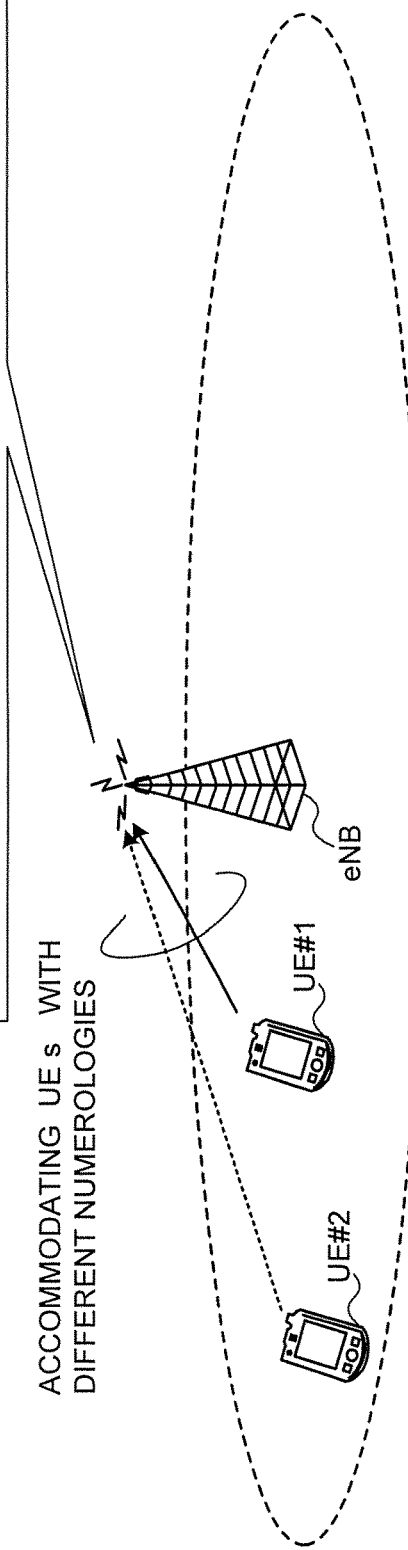
FIG. 1

FIG. 7A

| STATE | SUBCARRIER SPACING SUPPORTED BY UE [kHz] |
|---|---|
| 0 | 15 kHz ONLY |
| 1 | 15kHz, 30kHz |
| 2 | 15kHz, 30kHz, 60kHz |
| 3 | 15kHz, 30kHz, 60kHz, 120kHz |

FIG. 7B

| NUMBER | LATENCY REQUIREMENT |
|---|---|
| 0 | low |
| 1 | high |

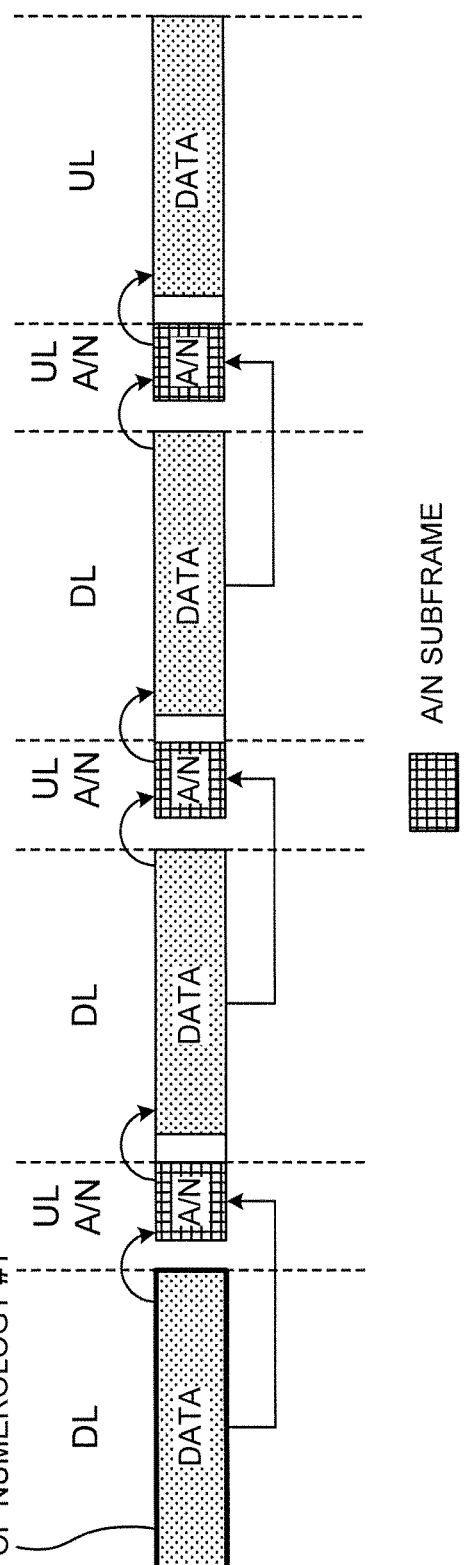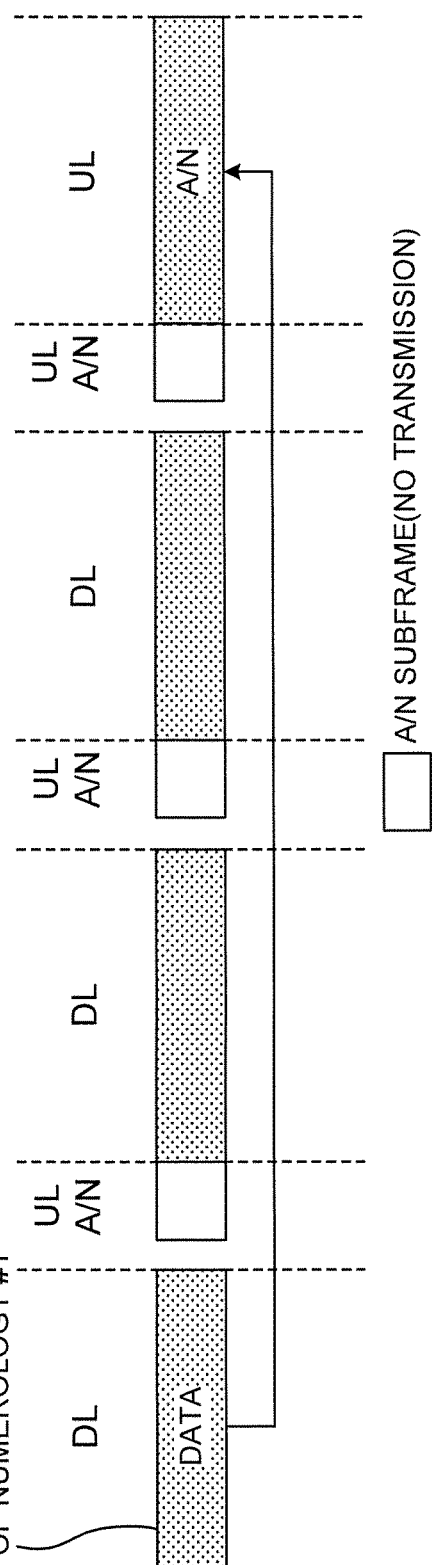

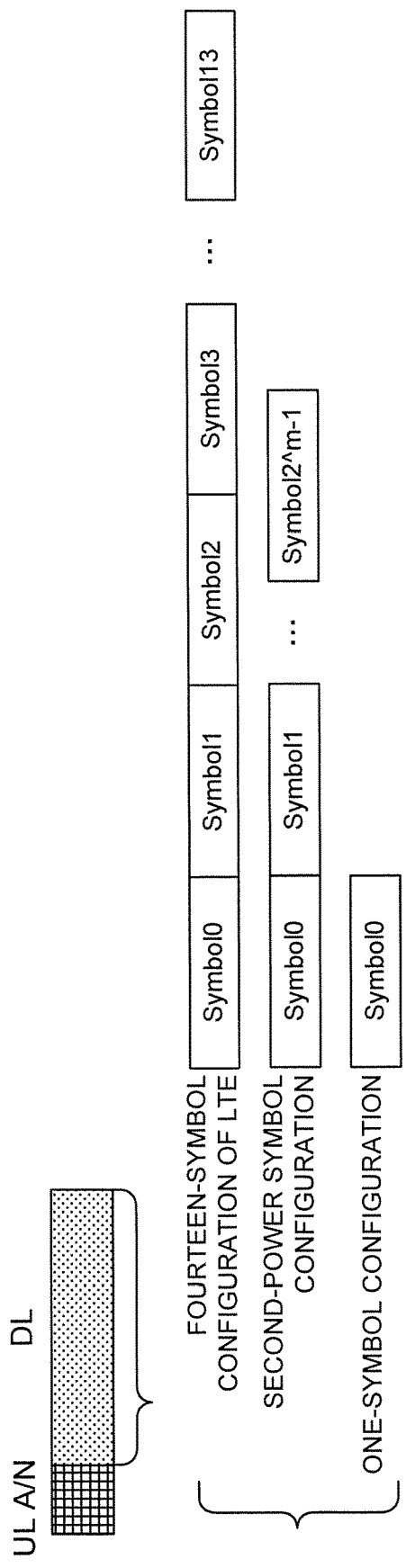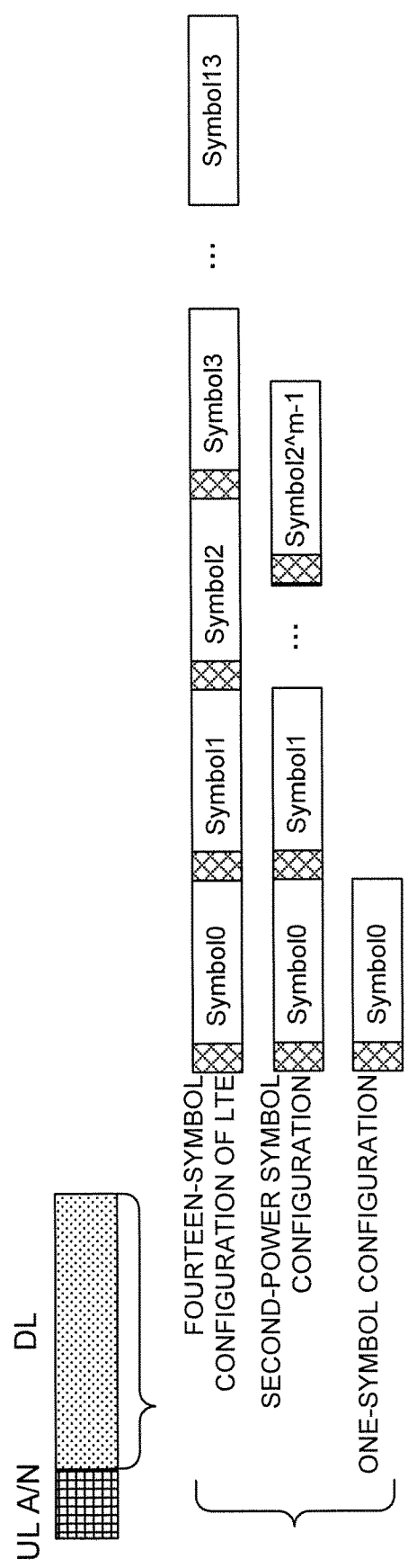

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

In existing LTE systems (for example, LTE Rel. 10 and later versions), carrier aggregation (CA) to integrate multiple carriers (component carriers (CCs), cells, etc.) is introduced in order to achieve broadbandization. Each carrier is configured with the system bandwidth of LTE Rel. 8 as one unit. In addition, in CA, multiple CCs under the same radio base station (eNB (eNodeB)) are configured in a user terminal (UE (User Equipment)).

Meanwhile, in existing LTE systems (for example, LTE Rel. 12 and later versions), dual connectivity (DC), in which multiple cell groups (CGs) formed by different radio base stations are configured in a user terminal, is also introduced. Each cell group is comprised of at least one cell (CC, cell, etc.). In DC, since multiple CCs of different radio base stations are integrated, DC is also referred to as "inter-eNB CA."

In existing LTE systems (for example, LTE Rels. 8 to 13), downlink (DL) and/or uplink (UL) communication are carried out using 1-ms transmission time intervals (TTIs). This 1-ms TTI is the unit of time to transmit one channel-encoded data packet, and is the processing unit in scheduling, link adaptation and so on.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, 5G, NR, etc.), it is desirable to accommodate various services such as high-speed and large-capacity communication (eMBB (enhanced Mobile Broad Band)), massive access (mMTC (Massive MTC)) from devices (user terminal) for inter-device communication (M2M (Machine-to-Machine)) such as IoT (Internet of Things) and MTC (Machine Type Communication), and low-latency, reliable communication (URLLC (Ultra-Reliable and Low Latency Communication)), in a single framework. In URLLC, better latency reduction effect than eMBB or mMTC is required.

Thus, in future radio communication systems, it is assumed that a plurality of services having different requirements for latency reduction will be co-present. Therefore, in future radio communication systems, a study is underway to multiplex multiple user terminals with different numerologies in the same carrier (CC, cell).

Here, "numerology" refers to communication parameters in the frequency direction and/or the time direction (for example, at least one of the subcarrier spacing (subcarrier interval), the bandwidth, the symbol length, the time length of CPs (CP length), the subframe length, the time length of TTIs (TTI length), the number of symbols per TTI, the radio frame structure, the filtering process, the windowing process, and so on).

However, when multiple user terminals with different numerologies are multiplexed in the same carrier, there is a possibility that the latency-reducing effect, which accompanies introduction of subframes of shorter time lengths than 1 ms, cannot be achieved on a satisfactory level.

The present invention has been made in view of the above, and it is therefore an object of the present invention to provide a user terminal and a radio communication method, whereby the effect of latency reduction can be achieved effectively when a plurality of user terminals with different numerologies are multiplexed in the same carrier.

Solution to Problem

According to one aspect of the present invention, a user terminal has a receiving section that receives a downlink (DL) signal in a carrier in which a plurality of user terminals with different numerologies are multiplexed, a transmission section that transmits the retransmission control information of the DL signal, and a control section that configures a retransmission control subframe based on the same numerology among the plurality of user terminals, and controls transmission of the retransmission control information in the retransmission control subframes.

Advantageous Effects of Invention

According to the present invention, when a plurality of user terminals with different numerologies are multiplexed in the same carrier, the effect of latency reduction can be achieved effectively.

BRIEF DESCRIPTION OF DRAWINGS

FIG. 1 is a diagram to show an example of future radio communication system supporting multiple numerologies;

FIG. 7A is a diagram to show an example of support information according to the present embodiment, and FIG. 7B is a diagram to show an example of latency requirement information according to the present embodiment;

FIGS. 10A and 10B are diagrams to show other examples of A/N transmission control according to the present embodiment;

FIGS. 15A and 15B are diagrams, each showing an example of the DL subframe configuration according to the present embodiment;

DESCRIPTION OF EMBODIMENTS

Figure 2:
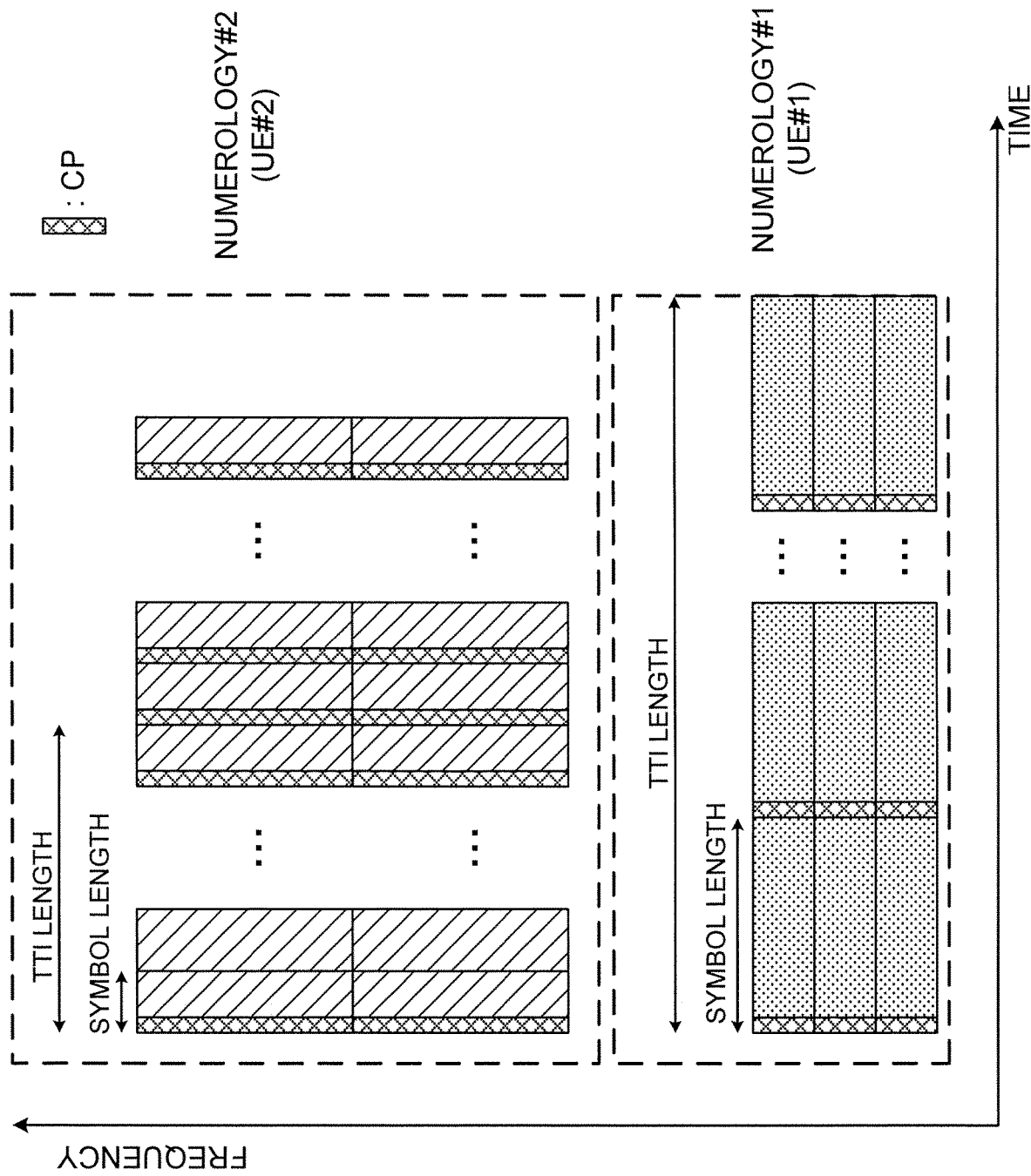
FIG. 2 is a diagram to show an example of FDM of multiple numerologies.

Radio access schemes (5G RAT) for future radio communication systems are expected to introduce one or more numerologies (also referred to as "multiple numerologies," "multi-numerology," and others) in order to support wide frequency bands and various services with different requirements. Here, a "numerology" refers to a set of communication parameters (radio parameters) in the frequency and/or time direction. This set of communication parameters may include at least one of, for example, the subcarrier spacing, the bandwidth, the symbol length, the CP length, the TTI (subframe) length, the number of symbols per TTI (subframe), the radio frame configuration, the filtering process and the windowing process.

When "numerologies are different," this means that, for example, at least one of the subcarrier spacing, the bandwidth, the symbol length, the CP length, the TTI (subframe) length, the number of symbols per TTI (subframe) and the radio frame configuration is different between numerologies, but this is by no means limiting. A future radio communication system that supports multiple numerologies is configured so that a plurality of user terminals with different numerologies can be accommodated.

FIG. 1 is a diagram to show an example of a future radio communication system supporting multiple numerologies. Note that, although FIG. 1 illustrates numerologies #1 and #2 with different symbol lengths and subcarrier spacings, as mentioned earlier, the types of numerologies are not limited to these. Also, FIG. 1 shows user terminals #1 and #2, but the number of user terminals (UE (User Equipment)) is not limited to two.

For example, FIG. 1 shows user terminal #1 to use numerology #1 with a relatively narrow subcarrier spacing (for example, 15 kHz), and user terminal #2 to use numerology #2 with a relatively wide subcarrier spacing (for example, 30 kHz, 60 kHz, 120 kHz, etc.). The subcarrier spacing of numerology #1 may be the same as the subcarrier spacing in existing LTE systems—that is, 15 kHz. The subcarrier spacing of numerology #2 may be N (N>1) times the subcarrier spacing of numerology #1.

Furthermore, subcarrier spacing and symbol length are mutually reciprocal. Therefore, if the subcarrier spacing of numerology #2 is made N times the subcarrier spacing of numerology #1, the symbol length in numerology #2 becomes 1/N of the symbol length of numerology #1. Also, numerology #2 and numerology #1 may also have different structures of resource elements (REs), which are formed with subcarriers and symbols.

When the subcarrier spacing becomes wider, it is possible to effectively suppress the inter-channel interference caused by the Doppler shift when the user terminal moves and the communication quality degradation due to phase noise in the receiver of the user terminal. In particular, in high frequency bands such as several tens of GHz, the deterioration of communication quality can be effectively prevented by expanding the subcarrier spacing. Therefore, numerology #1, in which the subcarrier spacing is wider than in numerology #2, is suitable for communication in high frequency bands. In addition, by widening the subcarrier spacing, robustness for high-speed movement also improves, so that numerology #2, in which the subcarrier spacing is wider than in numerology #1, is suitable for high-speed movement.

Also, when the symbol length becomes shorter, the TTI length formed with a predetermined number (for example, fourteen or twelve) of symbols also becomes shorter, and so this is effective for reducing latency (latency reduction). In IoT (Internet of Things), MTC (Machine Type Communication), M2M (Machine To Machine), URLLC (Ultra-reliable and low latency communication) etc., although the amount of data is small, reduced latency is required. For such services that impose strict requirements on latency, numerology #2 with a shorter symbol length than numerology #1 is suitable. Note that TTIs (subframes) shorter than in existing LTE systems (for example, TTIs shorter than 1 ms) may be referred to as "shortened TTIs," "short TTIs," "shortened subframes," "short subframes," "partial subframes," and so on.

Meanwhile, for services that require high spectral efficiency and high-speed communication, such as MBB (Mobile Broad Band) and others, numerology #1 with a narrow subcarrier spacing compared to numerology #2 is suitable. Numerology #1 is also suitable for massive MIMO (Massive Multiple-Input and Multiple-Output), in which many antenna elements are used.

Although not shown, the number of symbols to constitute the TTI (subframe) of each numerology may be the same as in existing LTE systems (for example, fourteen when a normal CP is used, twelve when an enhanced CP is used, and so on), or may be different. Furthermore, the unit of resource allocation (resource unit) in each numerology may be the same as or different from the resource block pair in existing LTE systems (which is, for example, twelve subcarriers× fourteen symbols, and also referred to as a "PRB (Physical Resource Block) pair"). A resource unit that is different from existing LTE systems may be referred to as an "enhanced RB (ERB)" and so on.

Furthermore, the symbols for use in each numerology may be OFDM (Orthogonal Frequency Division Multiplexing) symbols, or may be SC-FDMA (Single Carrier Frequency Division Multiple Access) symbols.

Also, although not shown, a format which makes the subcarrier spacing 1/N of existing LTE systems and makes the symbol length N times as large may be another possible example of numerology. According to this format, the overall symbol length increases, so that, even when the ratio of the CP length to the overall symbol length is constant, the CP length can be lengthened. This enables radio communication that is more robust against fading on communication paths.

Furthermore, the numerologies for use by user terminals may be configured semi-statically via higher layer signaling, such as RRC (Radio Resource Control) signaling or broadcast information, or may be changed dynamically by physical layer control information (L1/L2 control channels), for example. Alternately, the numerologies used by the user terminal may be changed by a combination of higher layer signaling and physical layer control information.

Future radio communication systems like described above are anticipated to multiplex multiple user terminals with different numerologies in the same carrier (CC, cell). For example, a plurality of user terminals with different numerologies may be multiplexed in the same carrier by frequency division multiplexing (FDM) and/or time division multiplexing (TDM).

FIG. 2 is a diagram to show an example of FDM of multiple numerologies. For example, in FIG. 2, numerology #1 and #2 are configured in different frequency resources in the same carrier (for example, resource blocks (PRBs (Physical Resource Blocks)), PRB pairs, subcarriers, etc.).

Note that, in FIG. 2, guard frequency resources are provided between frequency resources where different numerologies are allocated, but it is not necessary to provide these guard frequency resources. Also, in FIG. 2, the CP lengths of numerology #1 and #2 are the same length, but do not have to be the same length.

Also, for future radio communication systems, a study is in progress to scale the symbol length and/or the CP length based on the subcarrier spacing (scaled numerology) when user terminals of different numerologies are multiplexed in the same carrier (CC, cell).

Figure 3:
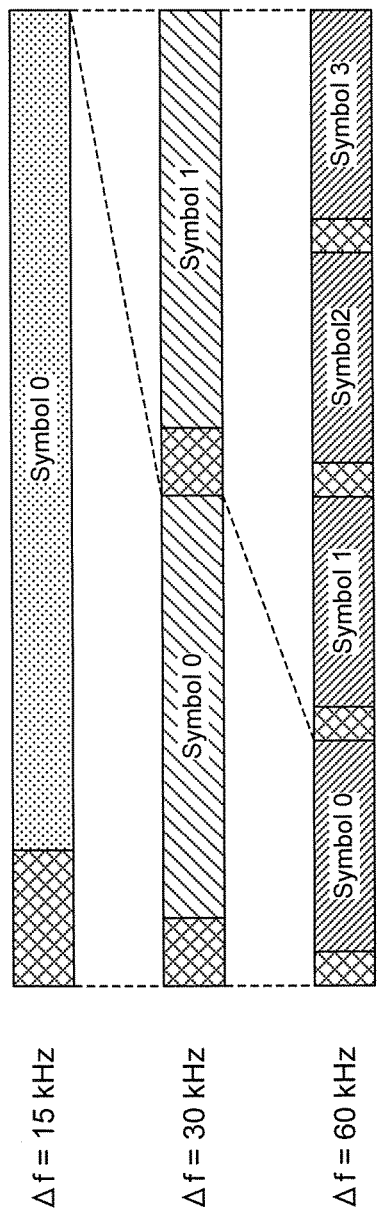
FIG. 3 is a diagram to show examples of scaled numerologies.

FIG. 3 is a diagram to show an example of scaled numerology. Note that, in FIG. 3, subcarrier spacings of 15 kHz, 30 kHz and 60 kHz are shown as examples, but the numerologies are by no means limited to these. Note that since subcarrier spacing and symbol length are inversely related to each other, the symbol lengths of subcarrier spacings of 30 kHz and 60 kHz are ½ times and ¼ times the symbol length of a subcarrier spacing of 15 kHz, respectively.

In FIG. 3, CP lengths added to symbol length with subcarrier spacings of 30 kHz and 60 kHz are configured to be ½ and ¼ times the CP length added to the symbol length with a subcarrier spacing of 15 kHz, respectively. As a result, even when a plurality of different subcarrier spacing and symbol length are applied, as shown in FIG. 3, the symbol boundaries can be matched.

In future radio communication systems, it is desirable to switch between UL and DL more flexibly than time division duplex (TDD) of existing LTE systems. For example, in future radio communication systems, it is desirable to be able to dynamically switch between UL and DL per subframe (dynamic TDD).

For example, if dynamic TDD is applied to the scaled numerology shown in FIG. 3, it is assumed that the switching of UL and DL is synchronized among different multiple numerologies in the same carrier (cell, CC).

Figure 4:
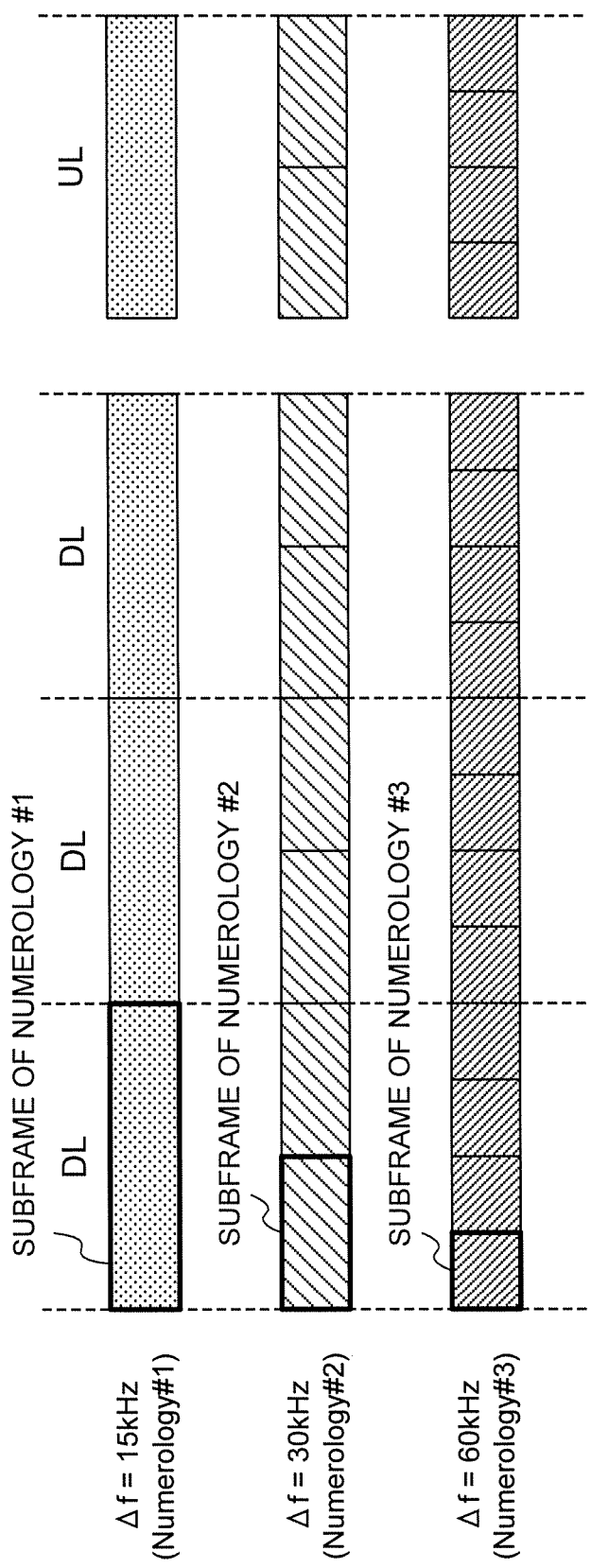
FIG. 4 is a diagram to show an example of dynamic TDD in a future radio communication system.

FIG. 4 is a diagram to show an example of dynamic TDD in a future radio communication system. Note that, in FIG. 4, numerology #1 with a subcarrier spacing of 15 kHz, numerology #2 with a subcarrier spacing of 30 kHz, and numerology #3 with a subcarrier spacing of 60 kHz are shown as examples, but the numerologies are by no means limited to these.

In the dynamic TDD shown in FIG. 4, in accordance with the switching of DL and UL per subframe in numerology #1, DL and UL are switched for every two subframes in numerology #2, and switched every four subframes in numerology #3.

For example, in FIG. 4, in numerology #1, DL is switched to UL after three DL subframes. In numerology #2, DL is switched to UL after six DL subframes, which match three DL subframes in numerology #1. In numerology #3, DL is switched to UL after twelve DL subframes, which match three DL subframes in numerology #1.

Also, when DL is switched to UL, a predetermined period may be provided for time alignment (TA) from DL to UL. As shown in FIG. 4, the predetermined time period may be the same time length between different numerologies.

Thus, in dynamic TDD in future radio communication systems, in synchronization with the switching of DL and UL in the numerology with the minimum subcarrier spacing (or the longest subframe length) (for example, numerology #1 in FIG. 4), DL and UL in other numerologies can also be switched (for example, numerologies #2 and #3 in FIG. 4).

However, when synchronization is assumed with the switching of DL and UL in the numerology with the minimum subcarrier spacing (or the longest subframe length), even when the subcarrier spacing (for example, 60 kHz) is extended and the subframe length is shortened, there is a possibility that the effect of latency reduction cannot be effectively obtained.

To be more specific, as a result of delaying the transmission timing of retransmission control information (for example, ACK (ACKnowledgment) or NACK (Negative ACKnowledgment), HARQ (Hybrid Automatic Repeat reQuest)-ACK, hereinafter referred to as "A/N"), there is a fear that the latency time from the time transmission data is generated on the transmission side until its proper receipt is acknowledged on the reception side may increase. Note that the latency time may include, for example, the time required for scheduling and packet transmission from packet generation on the transmitting side, or the time required for transmission of A/N on the receiving side, etc.

Figure 5:
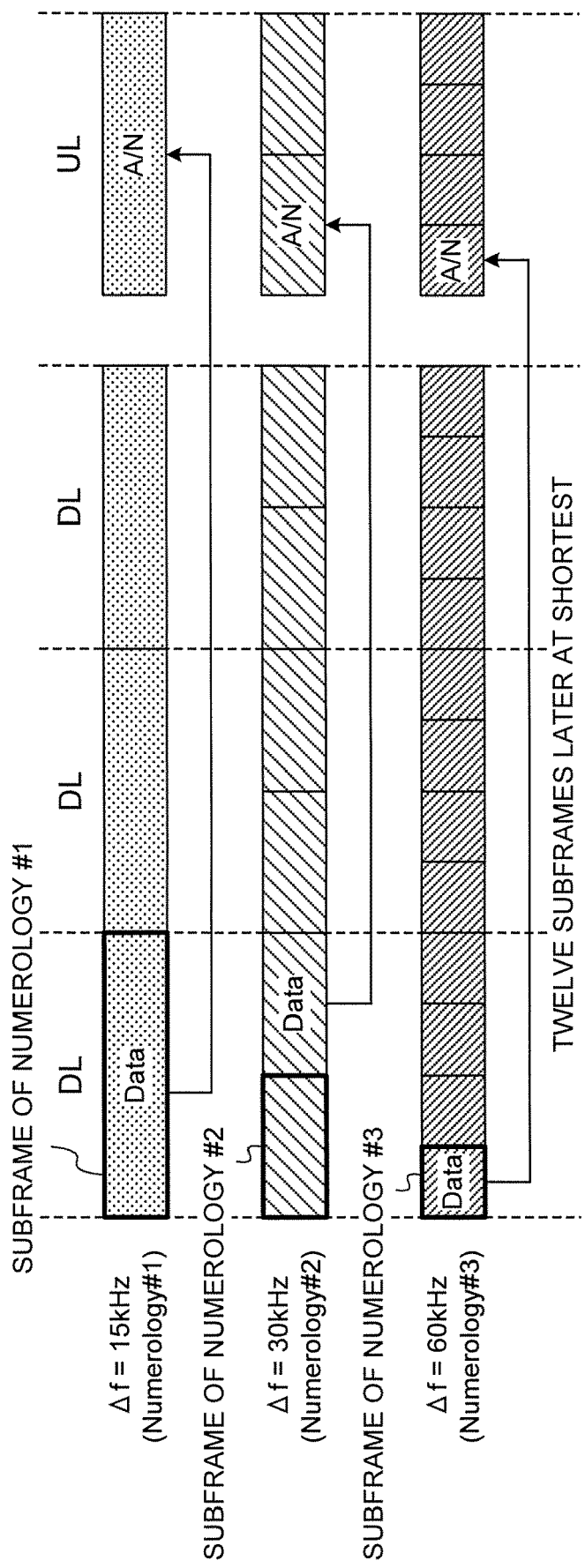
FIG. 5 is a diagram to show an example of A/N transmission in response to DL data.

FIG. 5 is a diagram to show an example of A/N transmission in response to DL data. For example, in the case shown in FIG. 5, the A/N in response to the DL data in the first subframe of numerology #3 can be transmitted only after twelve subframes at the shortest. This is because it is assumed that DL traffic is heavier than UL traffic, and, in dynamic TDD, it is assumed that the proportion of DL subframes will be larger than that of UL subframes.

Thus, when switching between DL and UL of another numerology in synchronization with the numerology of the smallest subcarrier spacing with the switching between DL and UL, even in the case where the user terminal applies numerology in which the subcarrier spacing is expanded to shorten the subframe length, as a result of delaying the transmission timing of the A/N, the effect of the latency reduction may not be effectively obtained.

So, the present inventors have come up with the idea of, when multiple user terminals with different numerologies are multiplexed in the same carrier, preventing the latency in A/N transmission timing, and obtaining the effect of latency reduction effectively, by configuring the retransmission control of the same numerology between these multiple user terminals.

Now, the present embodiment will be described below in detail. Note that, although multiple numerologies with different subcarrier spacings and symbol lengths will be exemplified below, the types of numerologies are not limited to these. For example, although not illustrated, the CP length of each numerology may be scaled according to subcarrier spacing, may be the same length, or may not be added.

Also, as an example of the present embodiment, a case will be described where the latency in the timing to transmit A/Ns in response to DL signals is prevented by configuring UL subframes for DL signal retransmission control (subframes for retransmission control, hereinafter referred to as "A/N subframes") will be described below, but this is by no means limiting. In the present embodiment, it is also possible to prevent the latency in A/N transmission timing in response to UL signals by configuring DL subframes for UL signal retransmission control.

In the present embodiment, the user terminal receives a DL signal and transmits an A/N in response to the DL signal, in a carrier where multiple user terminals with different numerologies are multiplexed. Furthermore, the user terminal configures an A/N subframe based on the same numerology among a plurality of user terminals, and controls transmission of A/Ns in this A/N subframe.

Figure 6:
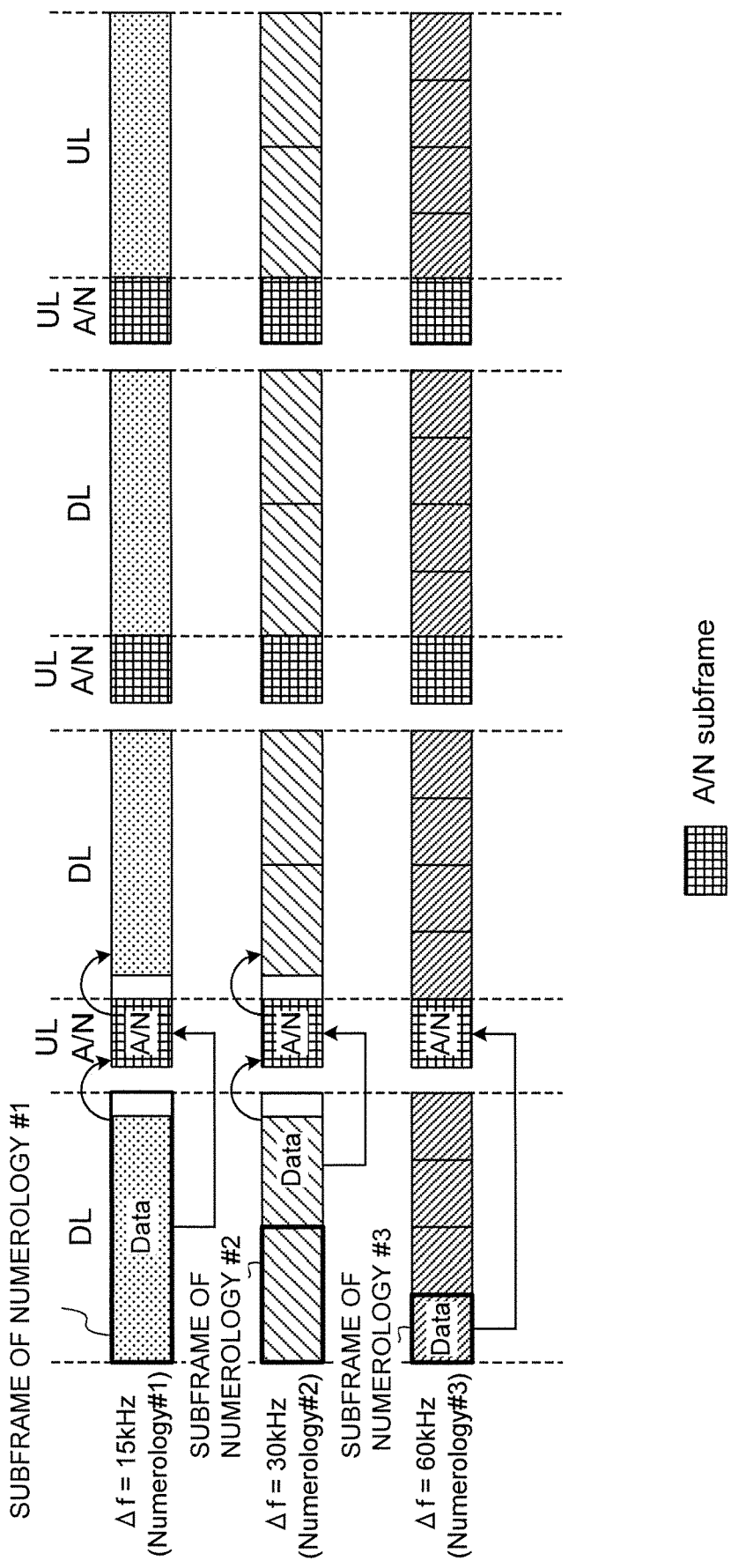
FIG. 6 is a conceptual diagram of communication using A/N subframes according to the present embodiment.

FIG. 6 is a conceptual diagram of communication using the A/N subframe according to the present embodiment. In FIG. 6, it is assumed that the subcarrier spacing of numerology #1 is 15 kHz, the subcarrier spacing of numerology #2 is 30 kHz, and the subcarrier spacing of numerology #3 is 60 kHz, and user terminals of numerologies #1 to #3 are multiplexed in the same carrier (cell). FIG. 6 is simply an example, and the number and types of numerologies multiplexed in the same carrier are not limited to these.

As shown in FIG. 6, in A/N subframes, the user terminals of numerologies #1 to #3 coordinate their numerologies (that is, use a single numerology) and transmit A/N in response to DL signals of different numerologies #1 to #3.

Here, the numerology of the A/N subframe may be a numerology with the widest (that is, the subframe length is the shortest) subcarrier spacing among different multiple numerologies multiplexed in the same carrier. For example, in FIG. 6, the numerology of the A/N subframe is configured identically to numerology #3.

Also, at intervals longer than the longest subframe length among numerology of multiple user terminals, the A/N subframe may be configured periodically or aperiodically. For example, in FIG. 6, the A/N subframe is periodically configured for each subframe of numerology #1. Also, a predetermined period for time alignment (TA) from DL to UL (hereinafter referred to as "TA period") may be configured before A/N subframes.

As shown in FIG. 6, by adjusting the numerology of the A/N subframe to the numerology with the widest subcarrier spacing (shortest subframe length), the increase in overhead due to insertion of A/N subframes can be suppressed. Also, the user terminal with a strict latency requirement, assumed to use the numerology of the widest subcarrier spacing (shortest subframe length), can transmit A/Ns without switching the numerology, so that the effect of latency reduction can be effectively obtained.

<User Terminal Operation>

Hereinafter, the operation of the user terminal in the carrier (cell, CC) on which the A/N subframe according to the present embodiment is configured will be described in detail.

<Configuration of A/N Subframes>

According to the present embodiment, a user terminal transmits information about the numerology which this user terminal supports (hereinafter referred to as "support information") and/or information about the latency requirement of this user terminal (hereinafter referred to as "latency requirement information") to the network (for example, a radio base station). For example, the user terminal can transmit the support information and the latency requirement information at the time of initial access or at the timing specified by the network.

FIG. 7A is a diagram to show an example of the support information according to the present embodiment. As shown in FIG. 7A, the support information may indicate the subcarrier spacing supported by the user terminal. Note that the support information shown in FIG. 7A is simply an example, and this is not limiting. For example, the support information may indicate any numerology supported by the user terminal, such as at least one of the subcarrier spacing, the symbol length, and the TTI length.

FIG. 7B is a diagram to show an example of the latency requirement information according to the present embodiment. As shown in FIG. 7B, the latency requirement information may indicate the level of the latency requirement (hereinafter referred to as "latency requirement level") of the user terminal. Note that the latency requirement level indicated by the latency requirement information is not limited to two levels, high and low.

The network (for example, radio base station) determines the numerology of A/N subframes based on the support information and/or the latency requirement information from the user terminal. The network transmits configuration information of A/N subframes indicating this numerology (hereinafter referred to as "A/N subframe configuration information") to the user terminal. This A/N subframe configuration information may be included in, for example, at least one of system information (for example, SIBs or the MIB, etc.), control information by higher layer signaling and physical layer control information (for example, downlink control information (DCI)).

Also, the A/N subframe configuration information may indicate the numerology (for example, at least one of the subcarrier spacing, the symbol length, the TTI length, the CP length, etc.) of an A/N subframe, and/or the location where the A/N subframe is inserted. The information indicating the inserting location may show the inserting location in the cycle of A/N subframes, or show the inserting location every predetermined number of subframes of the longest subframe length, every DL subframe, and so on. The user terminal can configure A/N subframes based on this A/N subframe configuration information.

<Switching Control of Numerology>

Next, the switching control of numerology between A/N subframes and DL subframes that are configured as described above will be explained. When the numerology of an A/N subframe and the numerology of a Dr subframe (DL signal) are different, the user terminal controls switching of the numerologies based on whether or not an A/N is transmitted in this A/N subframe.

FIG. 8 are diagram to show examples of switching control of numerology according to the present embodiment. In FIG. 8, switching control performed by the user terminal of numerology #1 in the carrier where numerologies #1 to #3 are multiplexed, as has been described with reference to FIG. 6, will be described. Here, the numerology of the A/N subframe is configured to numerology #3.

Figure 8A:
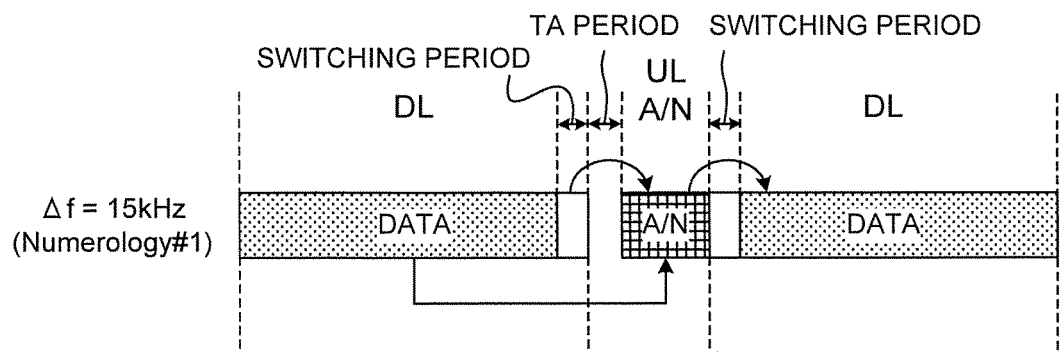
FIGS. 8A to 8C are diagrams to show examples of numerology-switching control according to the present embodiment.

As shown in FIG. 8A, when an A/N for a DL signal is transmitted in an A/N subframe of a different numerology than a DL subframe, the user terminal can stop receiving the DL signal, in the last predetermined number of symbols of the DL subframe immediately before the A/N subframe, and switch the numerology from #1 to #3. Also, the user terminal performs TA during the TA period. Also, in the first predetermined number of symbols of the DL (or UL) subframe immediately after the A/N subframe, the user terminal may stop receiving the DL signal (or transmitting the UL signal) and return the numerology from #3 to #1.

Figure 8B:
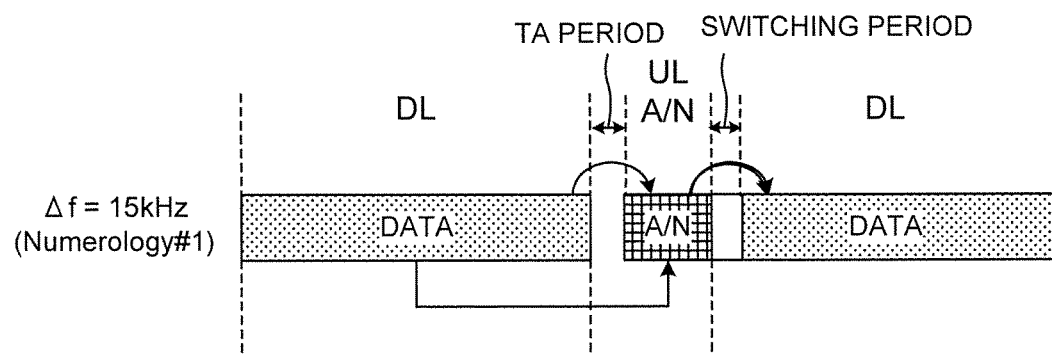

Alternately, as shown in FIG. 8B, when an A/N for a DL signal is transmitted in an A/N subframe of a different numerology than a DL subframe, the user terminal does not have to stop receiving the DL signal, in the last predetermined number of symbols of the DL subframe immediately before the A/N subframe. In FIG. 8B, in the TA period, the user terminal switches the numerology from #1 to #3 and performs TA.

Figure 8C:
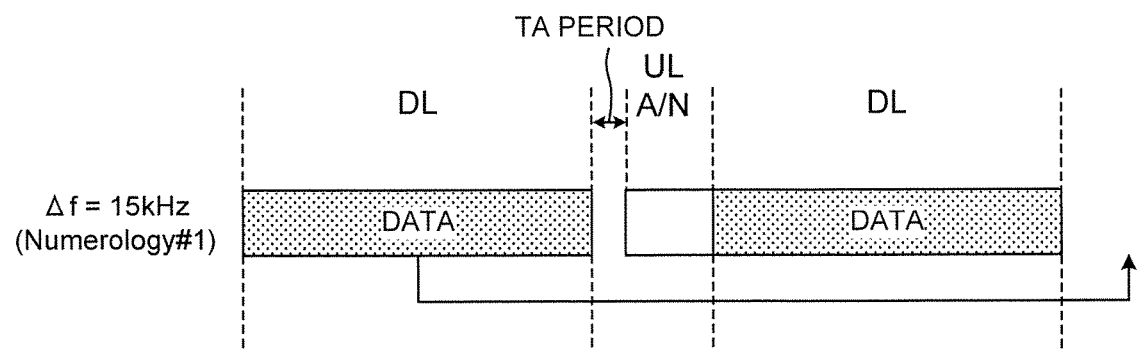

On the other hand, as shown in FIG. 8C, when the A/N of the DL signal is not transmitted in the A/N subframe, the user terminal does not have to stop receiving the DL signal in the last predetermined number of symbols of the DL subframe immediately before the A/N subframe. In FIG. 8C, the user terminal may stop transmitting and/or receiving in the TA period and in the A/N subframe.

Whether or not an A/N is transmitted in the A/N subframe (that is, at least one of the time resource, the frequency resource and the code resource for transmitting an A/N) may be indicated by at least one of system information, control information by higher layer signaling and physical layer control information (for example, DCI), or may be derived by the user terminal itself.

<A/N Transmission Control>

Figure 9:
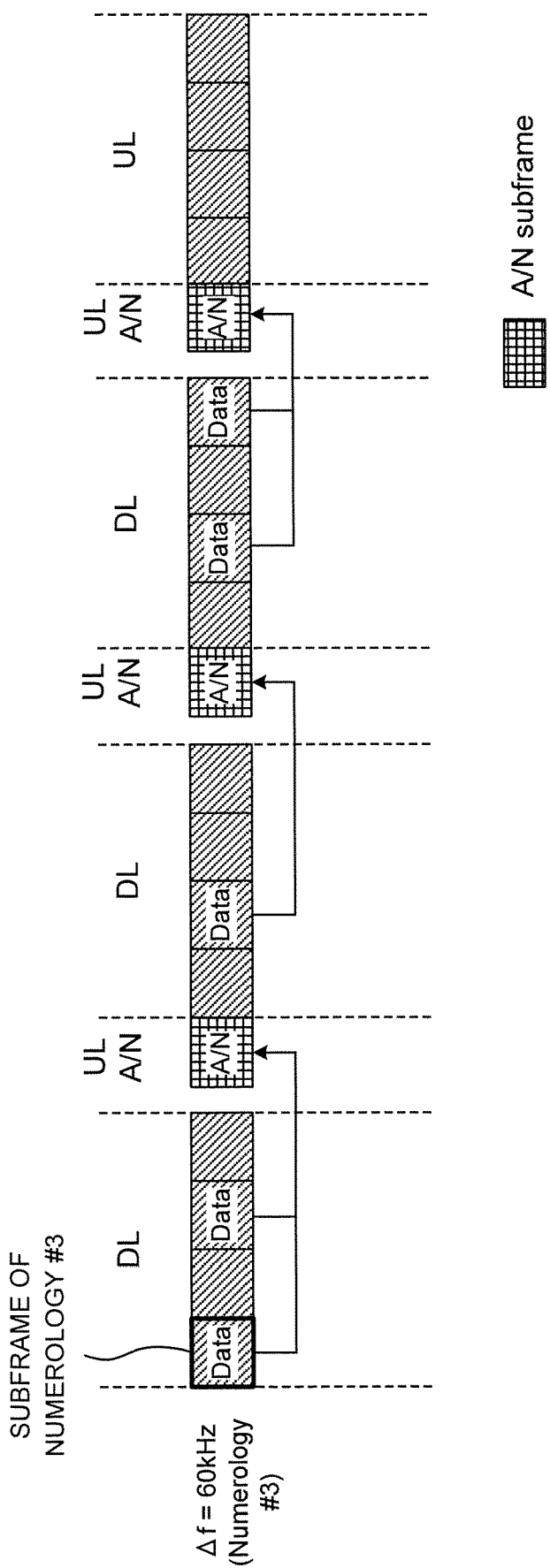
FIG. 9 is a diagram to show an example of A/N transmission control according to the present embodiment.

With reference to FIGS. 9 and 10 now, transmission control for A/Ns in response to DL signals in user terminals according to the present embodiment will be described. A user terminal controls transmission of an A/N based on at least one of the numerology of the A/N subframe, the numerology of the DL subframe (DL signal), and the latency requirement level of the user terminal.

In FIG. 9 to FIG. 10, as illustrated in FIG. 6, it is assumed that the user terminals of numerologies #1, #2 and #3 are multiplexed in the same carrier as an example. Here, it is assumed that the numerology of the A/N subframe is configured to numerology #3.

As shown in FIG. 9, if the numerology of A/N subframes and the numerology of DL subframes are equal, the user terminal transmits an A/N in response to the DL signal in at least one DL subframe in the next (for example, the earliest) A/N subframe.

For example, in FIG. 9, since same numerology #3 applied to the DL subframes and the A/N subframes, the user terminal transmits an A/N in response to the DL signal in the first DL subframe from the left and an A/N in response to the DL signal in the third DL subframe from the left, in the first A/N subframe.

As shown in FIG. 9, if the numerology of A/N subframes is equal to the numerology of DL subframes, an A/N is transmitted in the next (for example, the earliest) A/N subframe. Therefore, compared to the case of transmitting an A/N in the next (for example, the earliest) UL subframe, the latency time before an A/N is transmitted can be reduced.

On the other hand, as shown in FIG. 10, when the numerology of A/N subframes and the numerology of DL subframes are different, the user terminal may control the transmission of A/Ns for DL signals based on the latency requirement level.

As shown in FIG. 10A, when the latency requirement level is high, in the next (for example, the earliest) A/N subframe that is configured based on the above A/N subframe configuration information, the user terminal transmits an A/N in response to a DL signal in at least one DL subframe.

For example, in FIG. 10A, the user terminal switches the numerology from #1 to #3 before the next A/N subframe, and transmits an A/N in response to the DL signal of the DL subframe of numerology #1 in the A/N subframe of numerology #3. Furthermore, the user terminal stops transmitting and/or receiving in the first predetermined number of symbols of the DL subframe (or UL subframe) next to the A/N subframe, and switches the numerology from #3 to #1.

As shown in FIG. 10A, even when the numerology of A/N subframes is different from the numerology of DL subframes, an A/N is transmitted in the next (for example, the earliest) A/N subframe if the latency requirement level is high. Therefore, compared to the case where an A/N is transmitted in the next (for example, the earliest) UL subframe, the latency time before an A/N is transmitted can be reduced.

Alternatively, as shown in FIG. 10B, if the latency requirement level is low, the user terminal transmits an A/N in response to the DL signal in at least one DL subframe in the next (for example, the earliest) UL subframe without transmitting in the A/N subframe to be configured based on the above A/N subframe configuration information.

For example, in FIG. 10B, the user terminal does not switch the numerology from #1 to #3 even before an A/N subframe and does not transmit or receive in the A/N subframe. The user terminal waits until the UL subframe of the next numerology #1 and transmit an A/N in response to the DL signal of the DL subframe of numerology #1. Furthermore, the user terminal stops transmission and/or receipt in the first predetermined number of symbols of the next data subframe of the A/N subframe, and switches the numerology from #3 to #1.

As shown in FIG. 10B, when the numerology of an A/N subframe is different from the numerology of a DL subframe and the latency requirement level is low, an A/N is transmitted in the next (for example, the earliest) UL data subframe. Therefore, it is unnecessary to switch the numerology in order to transmit an A/N, and not necessary to provide a period for stopping receipt and/or transmission in data subframes (DL subframes, UL subframes, etc.). As a result, compared with the case shown in FIG. 10A, the efficiency of the use of the system (resource) can be improved.

<Operation Flow>

With referring to FIGS. 11 and 12, the operation flow in the above-described user terminal will be described. In the present embodiment, allocation of resources for transmitting A/Ns (hereinafter referred to as "A/N resources") in response to DL signals may be performed by the network (for example, radio base station) (first operation flow) or may be performed by the user terminal itself (second operation flow).

Figure 11:
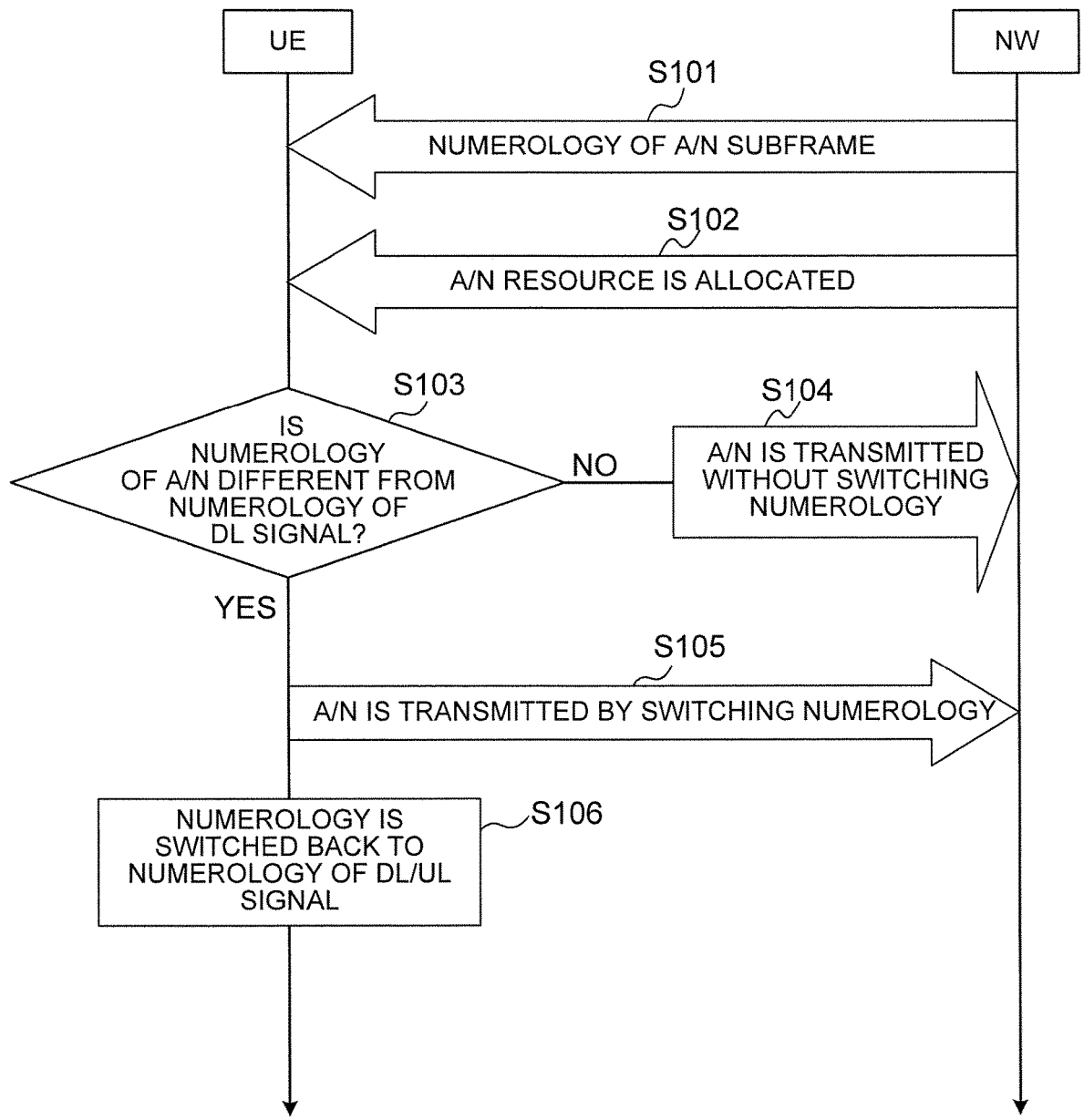
FIG. 11 is a diagram to show a first example of the operation flow according to the present embodiment.

FIG. 11 is a diagram to show an example of the first operation flow according to the present embodiment. As shown in FIG. 11, the network (for example, a radio base station) transmits the above-mentioned A/N subframe configuration information to the user terminal (step S101). For example, the A/N subframe configuration information may be reported to the user terminal by system information and/or higher layer signaling.

Also, the network transmits allocation information of A/N resource (hereinafter referred to as "A/N resource allocation information") to the user terminal (step S102). Here, the A/N resource allocation information may indicate at least one of the time resource, the frequency resource and the code resource that can be used for A/N transmission, or may indicate A/N subframe. The A/N resource allocation information may be included in at least one of system information, control information by higher layer signaling, and physical layer control information.

In FIG. 11, as an example, when the numerology of DL signals and the numerology of A/N subframes are equal, the A/N resource allocation information indicates (allocates) an A/N subframe as an A/N resource. Also, when the numerology of a DL signal is different from the numerology of an A/N subframe, the A/N resource allocation information may indicate (allocate) the UL data subframe as an A/N resource.

The user terminal determines whether or not the numerology of the DL signal (for example, PDSCH (Physical Downlink Shared Channel)) (DL subframe) is different from the numerology of the A/N subframe (step S103). For example, by comparing the time resource included in the A/N resource allocation information and the A/N subframe inserting location included in the A/N subframe configuration information, since the user terminal can judge whether the A/N resource allocation information indicates an A/N subframe or not, the user terminal can judge whether or not the numerology of the DL signal is different from the numerology of the A/N subframe, depending on whether the A/N resource allocation information indicates an A/N subframe.

If the numerology of a DL signal is equal to the numerology of an A/N subframe (step S103: NO), as has been described with reference to FIG. 9, the user terminal transmits an A/N in response to the DL signal in one or more data subframes with the previous A/N subframe, in the next A/N subframe, without switching the numerology (step S104).

If the numerology of the DL signal is different from the numerology of the A/N subframe (step S103: YES), as has been described with reference to FIG. 10A, the user terminal switches the numerology and transmits an A/N in response to the DL signal in one or more DL subframes with the previous A/N subframe in the next A/N subframe (step S105). In this case, the user terminal stops transmission and/or receipt in the first predetermined number of symbols of the next DL (or UL) subframe next to the A/N subframe and returns numerology to the original numerology (step S106).

Alternately, if the numerology of a DL signal and the numerology of an A/N subframe are different, they are not illustrated, but, as explained in FIG. 10B, the user terminal may transmit an A/N in the UL data subframe indicated by the A/N resource allocation information.

In the first operation flow, for example, also in the case where the A/N subframe is dynamically (may be an aperiodic) allocated, the user terminal can appropriately control the transmission of the A/N of the DL signal in the A/N subframe. Note that the second operation flow can also be applied to cases other than the case where the A/N subframe is dynamically configured.

Figure 12:
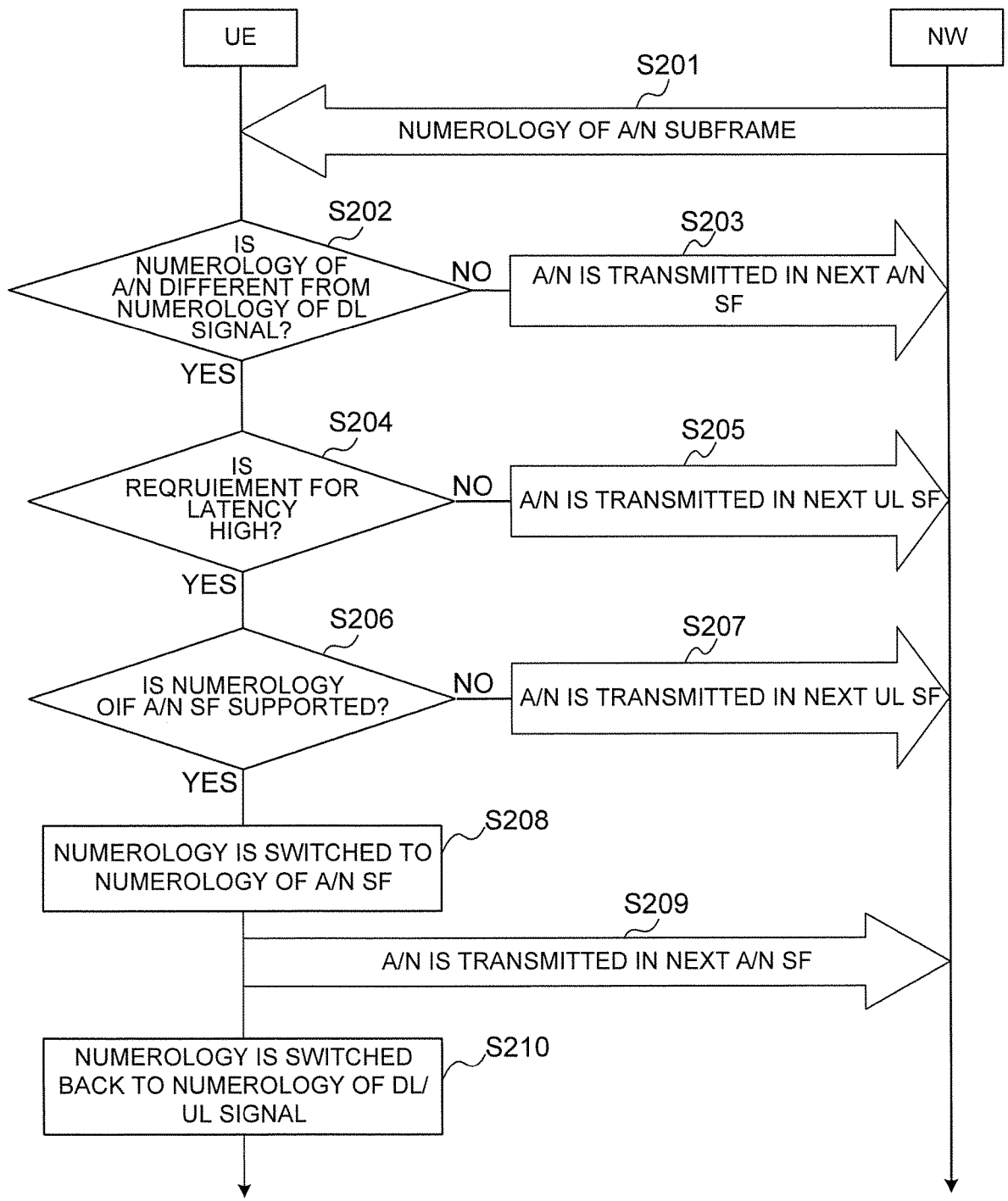
FIG. 12 is a diagram to show a second example of the operation flow according to the present embodiment.

FIG. 12 is a diagram to show an example of the second operation flow according to the present embodiment. Note that, steps S201, S202, and S203 of FIG. 12 are similar to steps S101, S103, and S104 of FIG. 11, respectively, explanation will be omitted.

If the numerology of the DL signal is different from the numerology of the A/N subframe (step S202: YES), the user terminal determines the latency requirement level (step S204). When the delay level is low (step S204: NO), the user terminal transmits the A/N of the DL signal in the next (for example, the earliest) UL subframe without switching numerology, as has been described with reference to FIG. 10B (step S205).

On the other hand, when the latency requirement level is high (step S204: YES), the user terminal determines whether or not to support numerology indicated by the A/N subframe configuration information (step S206). If numerology of the A/N subframe is not supported (step S206: NO), the user terminal transmits the A/N of the DL signal in the next (for example, the earliest) UL subframe without performing numerology switching, as has been described with reference to FIG. 10B (step S207).

On the other hand, when numerology of A/N subframe is supported (step S206: YES), the user terminal switches the numerology of the data subframe to the numerology of the A/N subframe before the next A/N subframe as has been described with reference to FIG. 10A (step S208). In the next A/N subframe, the user terminal transmits the A/N of the DL signal in one or more data subframes with the previous A/N subframe (step S209). In this case, the user terminal stops transmission and/or receipt in the first predetermined number of symbols of the next DL (or UL) subframe next to the A/N subframe and returns numerology to the original numerology (step S210).

Note that, in the second operation flow, the next A/N subframe is not limited to the earliest from the DL data subframe, but may be the earliest A/N subframe after expiration of the timer that defines the predetermined time (or TTI or subframe). The same applies to the next UL data subframe.

In the second operation flow, for example, even when the A/N subframe is configured semi-statically (may be periodic), the user terminal can appropriately control the transmission of the A/N of the DL signal in the A/N subframe. Note that, the second operation flow can also be applied except when A/N subframes are configured semi-statically.

(Frame Structure)

Next, the configuration of the radio frame including the A/N subframe, the configuration of DL subframes in the radio frame, and the configuration of A/M subframe according to the present embodiment will be explained in detail.

<Structure of Radio Frame>

Figure 13:
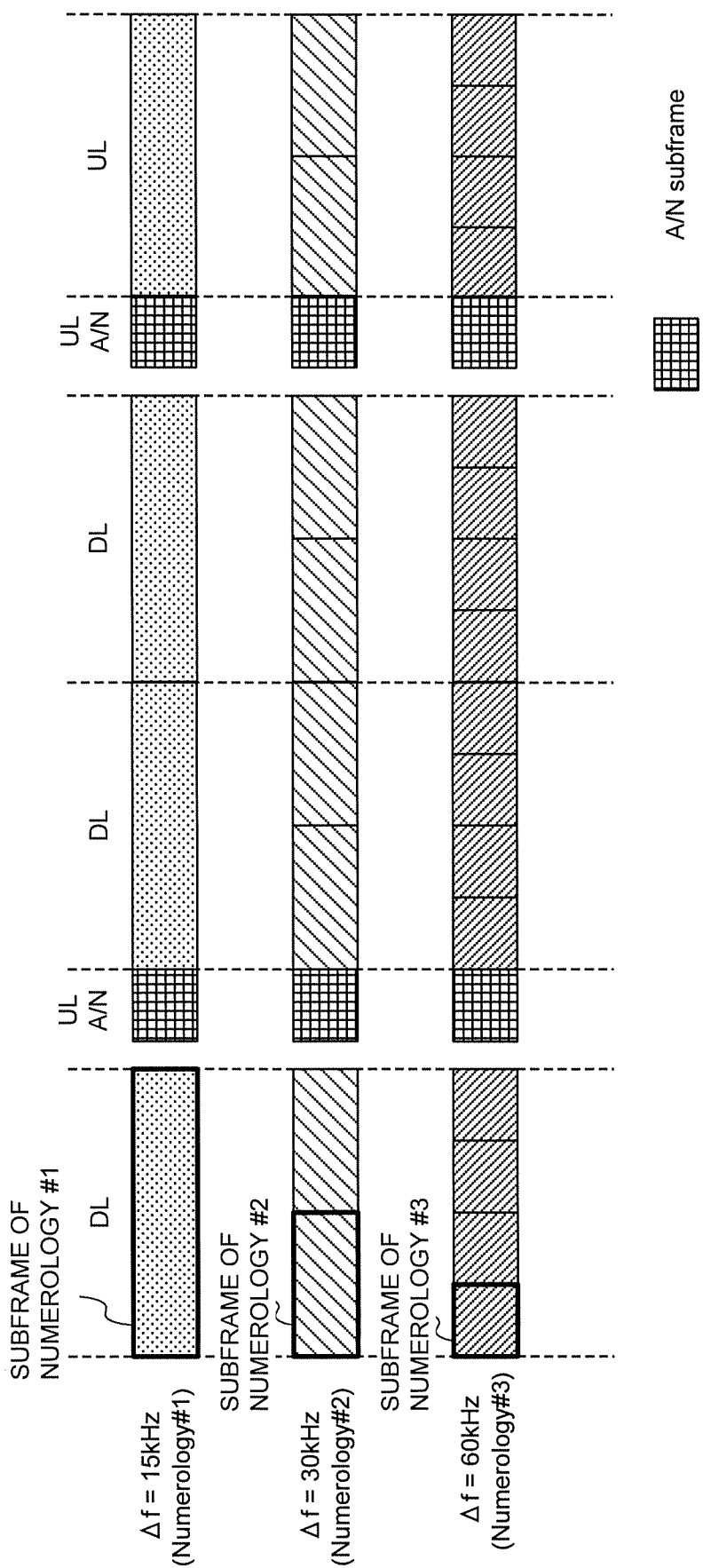
FIG. 13 is a diagram to show an example of the radio frame configuration according to the present embodiment.
Figure 14:
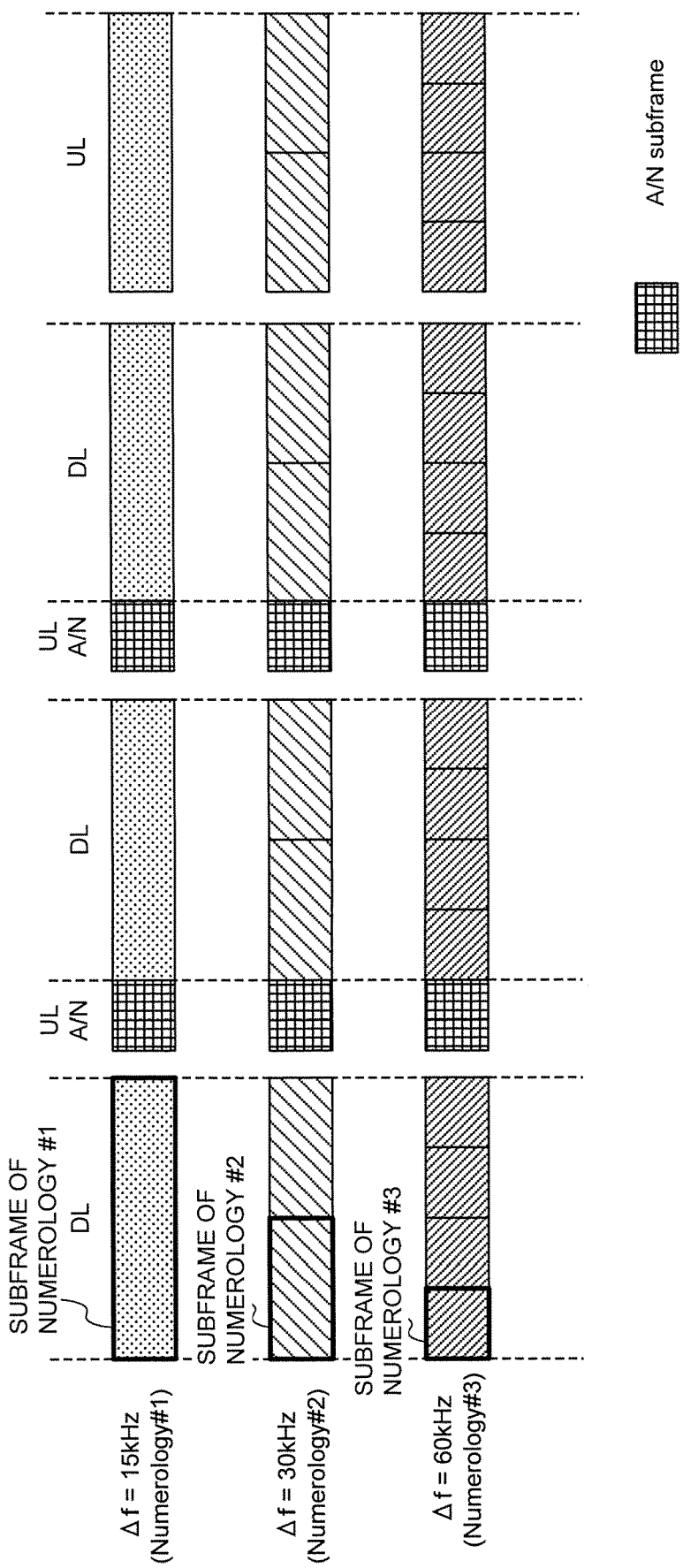
FIG. 14 is a diagram to show another example of the radio frame configuration according to the present embodiment.

With reference to FIGS. 6, 13, and 14, the configuration of a radio frame including A/N subframes will be described. The insertion (arrangement) location of A/N subframes (that is, in which data subframes A/N subframes should be inserted) may be specified in advance by the specification or may be designated from the network by at least one of system information, physical layer control information, and high layer signaling.

To be more specific, A/N subframes may be periodically arranged. For example, in FIG. 6, A/N subframes are arranged for every one subframe of the longest subframe length (numerology #1) (that is, every two subframes of numerology #2, and every four subframes of numerology #3).

Alternatively, the A/N subframe may not be arranged in all subframes of the longest subframe length. For example, in FIG. 13, A/N subframes are arranged for every two subframes of the longest subframe length (numerology #1) (that is, every four subframes of numerology #2, every eight subframes of numerology #3).

Also, the A/N subframe needs not be inserted before the UL subframe. For example, in FIG. 14, the A/N subframe is not placed before the UL subframe of the longest subframe length (numerology #1). Note that, the insertion rule of the A/N subframe as described above is merely an example, and these are by no means limiting.

(UL/DL Subframe Format)

With reference to FIG. 15, the configuration of DL subframes according to the present embodiment will be described. Note that, in FIG. 15, the configuration of DL subframes will be described as an example, but the UL subframe can be constructed similarly.

As shown in FIG. 15A, the DL subframe may be comprised of the same 14 symbols as in existing LTE systems, or may be comprised of the number of 2 m power (M>1) symbols, or may be comprised of one symbol.

In addition, as shown in FIG. 15A, CP may not be added to all the symbols in the DL subframe, or as shown in FIG. 15B, a CP may be added to each symbol in the DL subframe. Also, though not illustrated, CP may be added only to some symbols.

<A/N Subframe Configuration>

Figure 16:
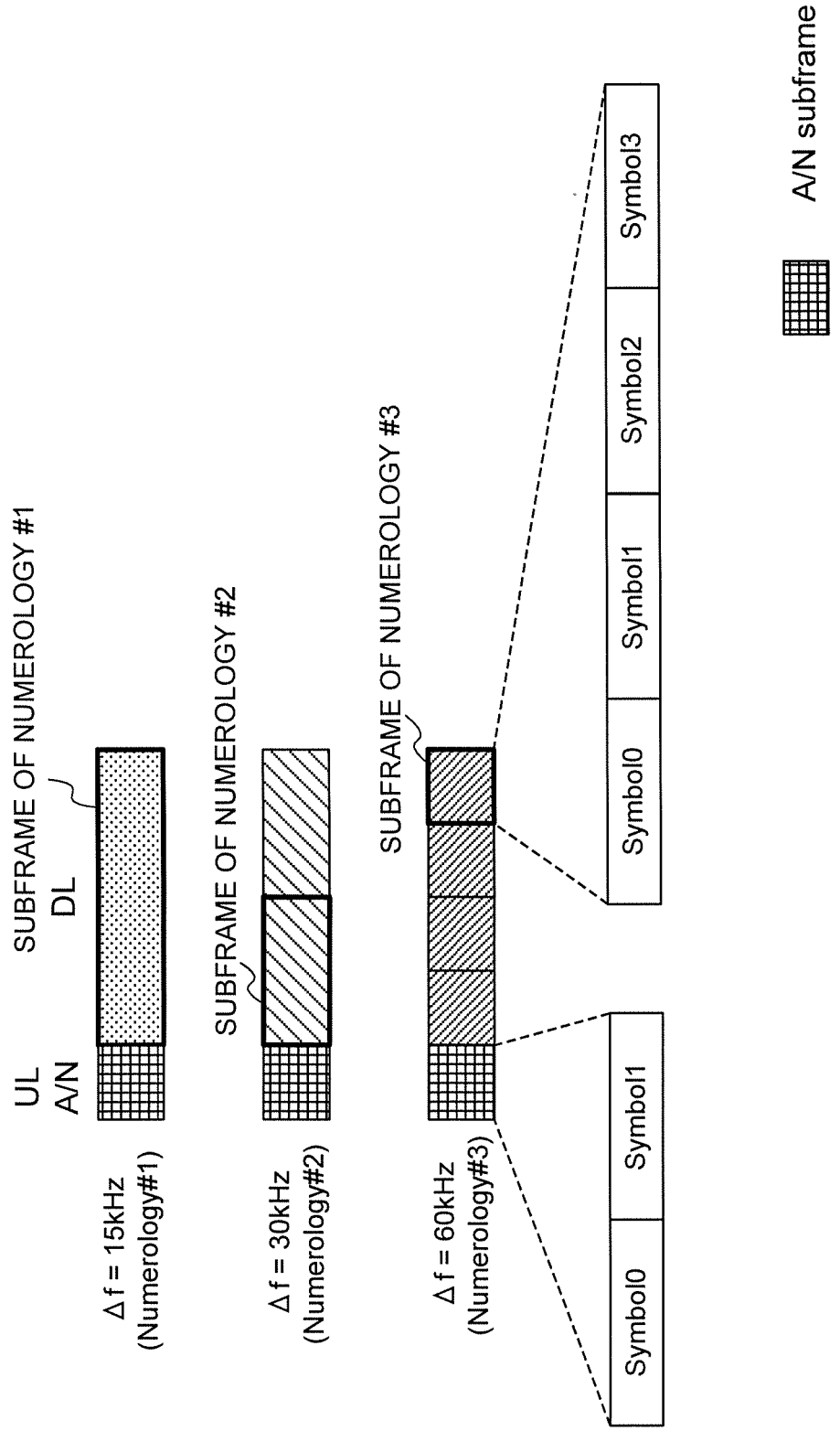
FIG. 16 is a diagram to show an example of the A/N subframe configuration according to the present embodiment.

With reference to FIG. 16 to FIG. 19, the configuration of A/N subframes according to the present embodiment will be described. FIG. 16 is a diagram to show an example of the configuration of A/N subframes according to the present embodiment. Note that, in FIG. 16, it is assumed that the user terminals of numerologies #1, #2 and #3 are multiplexed in the same carrier. Here, the numerology of the A/N subframe may be configured to numerology #3.

As shown in FIG. 16, the number of symbols of the A/N subframe of numerology #3 may be the number of symbols different from the DL subframe of same numerology #3 (subcarrier spacing 60 kHz). For example, in FIG. 16, an A/N subframe is comprised of two symbols, and the DL subframe of same numerology #3 is comprised of four symbols. In FIG. 16, the configuration of A/N subframes inserted in each DL subframe of numerologies #1 to #3 is the same.

As shown in FIG. 16, by making the number of symbols in an A/N subframe smaller than the number of symbols in a DL subframe of the same subcarrier spacing, the increase in overhead due to insertion of A/N subframes can be suppressed. Note that, the A/N subframe may be comprised of the same number of symbols as the DL subframe of same numerology #3.

In the A/N subframe, it is assumed that not only the A/N of the DL signal of a single DL subframe but also the A/N of the DL signal of a plurality of DL subframes are transmitted (for example, see the first and third A/N subframes from the left of FIG. 9). In this case, how to transmit A/N of a plurality of DL subframes with a single A/N subframe is a problem.

Figure 17:
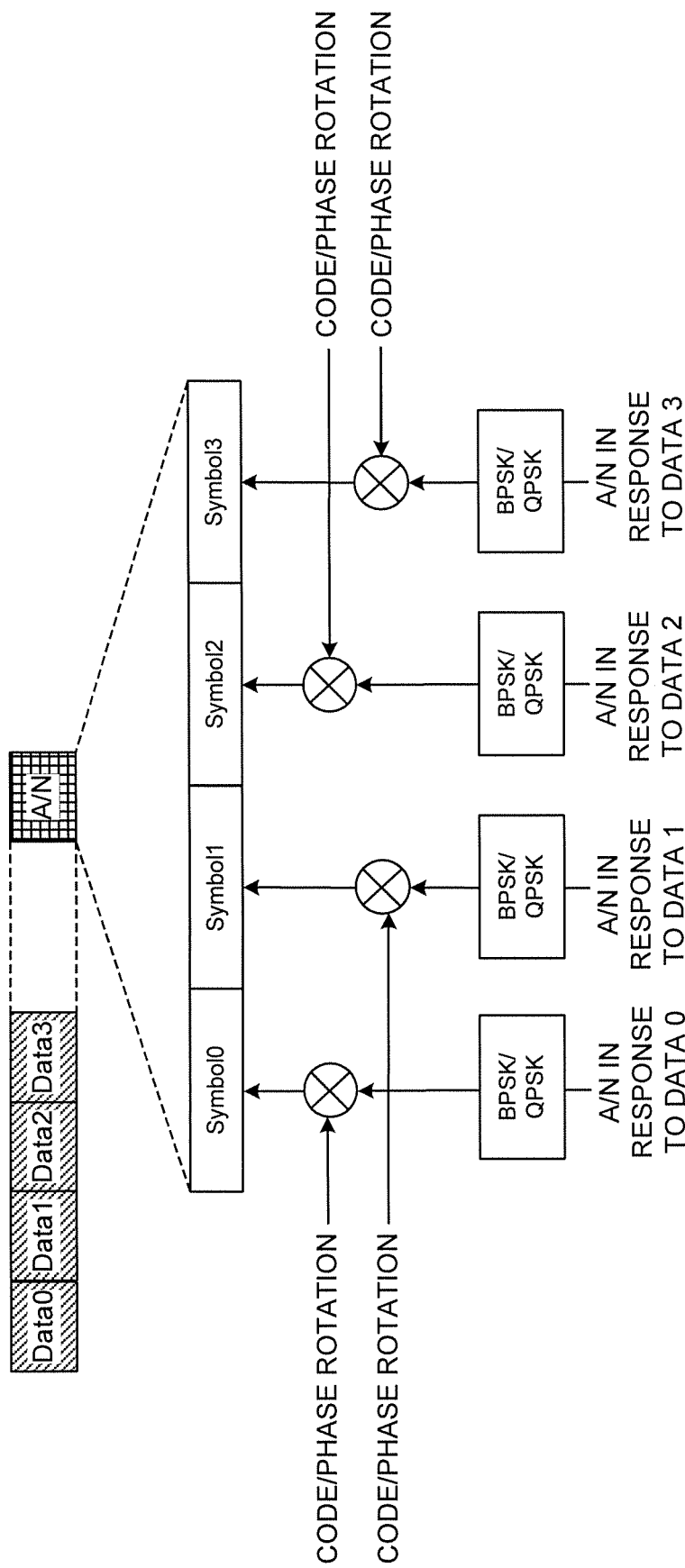
FIG. 17 is a diagram to show an example of a detailed A/N subframe configuration according to the present embodiment.
Figure 18:
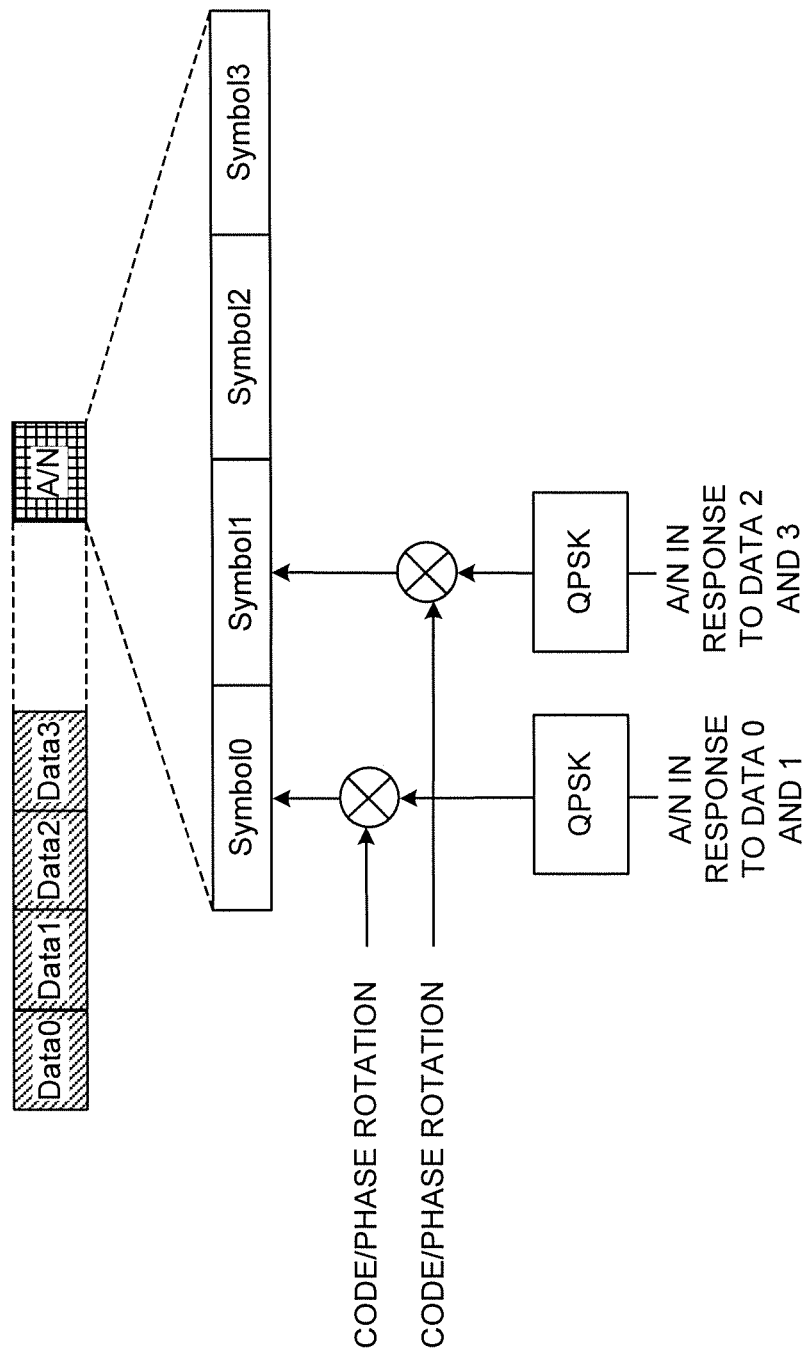
FIG. 18 is a diagram to show another example of a detailed A/N subframe configuration according to the present embodiment.
Figure 19:
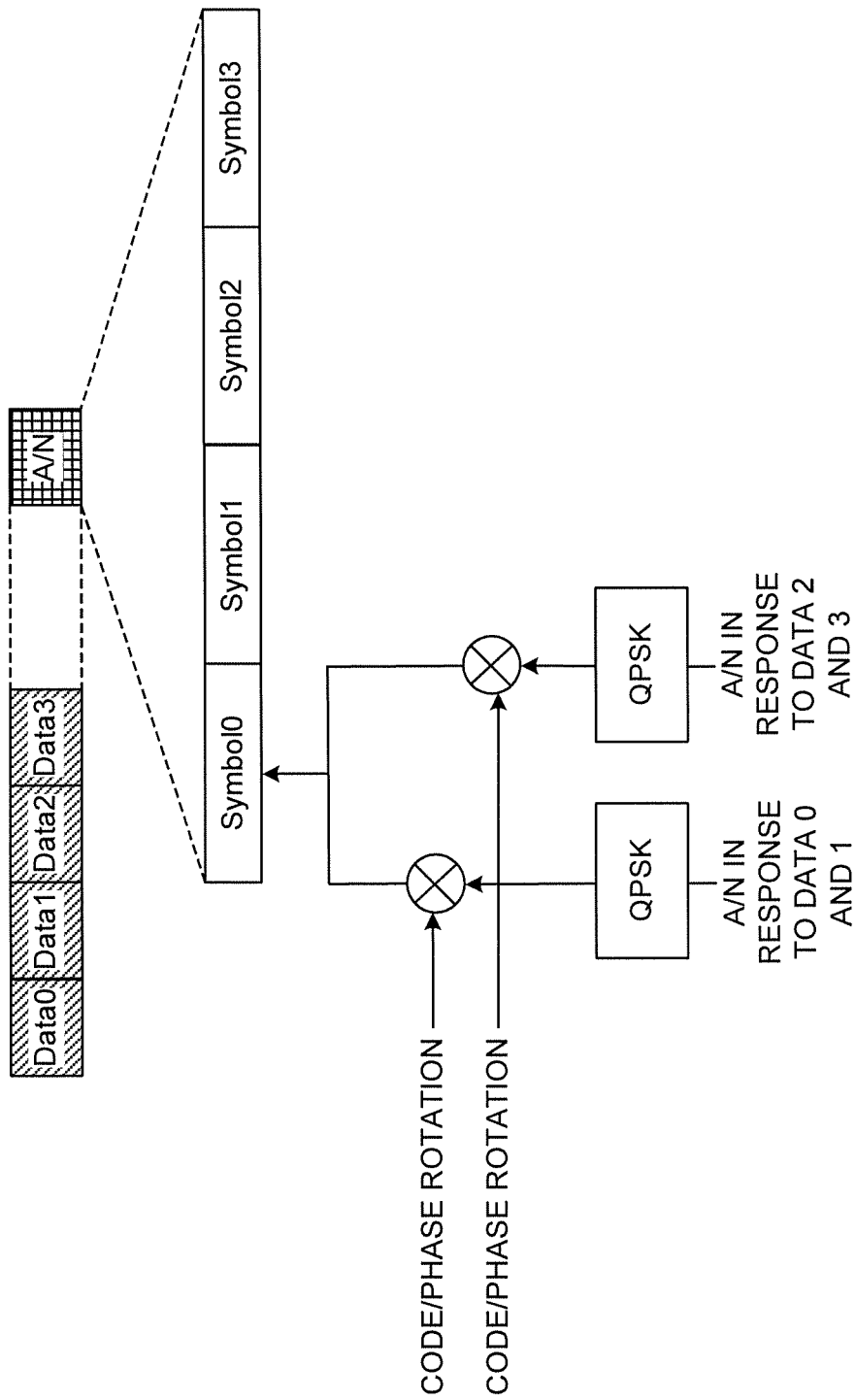
FIG. 19 is a diagram to show another example of a detailed A/N subframe configuration according to the present embodiment.

With reference to FIG. 17 to FIG. 19, the configuration of an A/N subframe for a plurality of DL subframes will be described. Note that a UL control channel (for example, PUCCH (Physical Uplink Control Channel)) may be used to transmit A/Ns in an A/N subframe. The configurations of A/N subframes shown in FIG. 17 to FIG. 19 may be referred to as "PUCCH format" and so on.

In FIG. 17 to FIG. 19, a case will be described where an A/N in response to each of DL data 0 to 3 of four DL subframes is transmitted in an A/N subframe. Note that, in FIG. 17 to FIG. 19, although a predetermined time interval is shown between the DL subframes of data 0 to 3 and the A/N subframe, the A/N subframe may follow immediately after the DL subframe of data 3.

As shown in FIG. 17, A/Ns in response to a plurality of pieces of DL data (DL signals) may be mapped to different symbols in an A/N subframe. For example, in FIG. 17, the A/N of each DL data is separately modulated and given code and/or phase rotation. Note that, for example, BPSK (Binary Phase Shift Keying) is conceivable as a modulation scheme, QPSK (Quadrature Phase Shift Keying) may be used assuming the case of two-layer MIMO or carrier aggregation of two or more CCs.

Alternatively, as shown in FIG. 18, A/Ns in response to a plurality of pieces of DL data (DL signals) may be mapped to at least one symbol in the A/N subframe. For example, in FIG. 18, A/Ns in response to DL data are combined and modulated by two DL data, given code and/or phase rotation and mapped to different symbols. Note that, for example, QPSK may be used as the modulation scheme.

Alternatively, as shown in FIG. 19, A/Ns in response to a plurality of pieces of DL data (DL signals) may be mapped to a single symbol in an A/N subframe. For example, in FIG. 19, A/Ns in response to DL data are combined ever two pieces of DL data, and then modulated, encoded and applied phase rotation, and mapped to the same symbol. Note that, for example, QPSK may be used as the modulation scheme.

Alternatively, A/Ns in response to DL data (DL signals) of a plurality of DL subframes may be transmitted in a single A/N subframe using existing PUCCH format (for example, PUCCH format 3).

<Subframe Length>

With reference to FIG. 27, the definition of the subframe length according to the present embodiment will be explained. Note that, in FIG. 27, the definition of the subframe length of the DL subframe is described as an example, but the UL subframe can be constructed similarly. In addition, in FIG. 27, numerology #1 will be described as an example, but other numerologies can be applied in the same way.

Figure 27A:
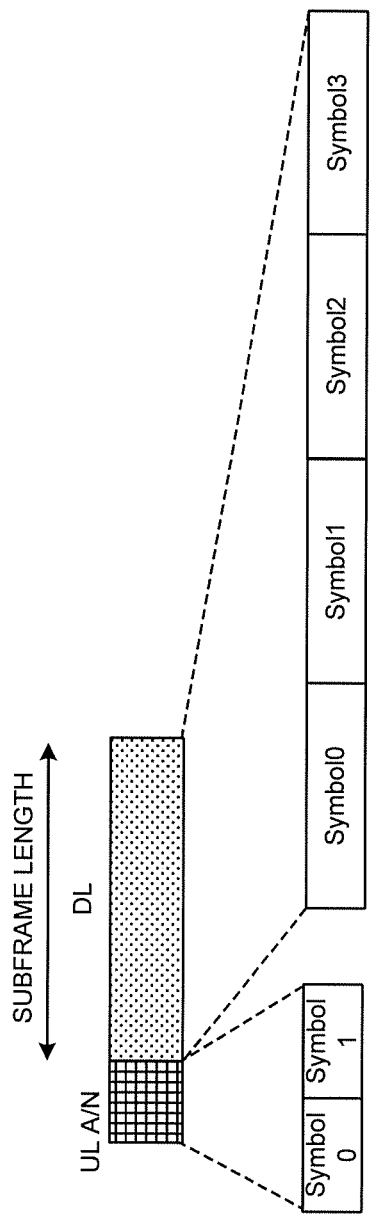
FIGS. 27A and 27B are diagrams, each showing an example of the definition of the subframe length according to the present embodiment.

As shown in FIG. 27A, the subframe length of a DL subframe may be the length of DL signal symbols (hereinafter abbreviated as "DL symbols") times the number of DL symbols. In this case, an A/N subframe is provided separately from the DL subframe. As shown in FIG. 27A, the numerology of the A/N subframe and the numerology (here, symbol length, subcarrier spacing, subframe length, number of symbols) of the DL subframe may be different, but this is not limiting, and they may be the same.

Figure 27B:
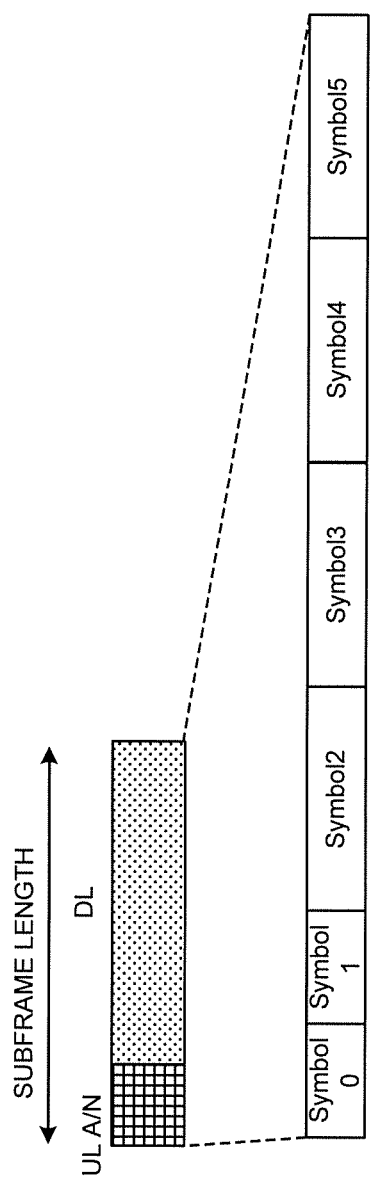

Alternatively, as shown in FIG. 27B, the subframe length of the DL subframe may be obtained by adding (the length of symbols for A/N (hereinafter abbreviated as "A/N symbols")×the number of A/N symbols) to (the DL symbol length×the number of DL symbols). In this case, one or more A/N symbols and one or more DL symbols are included in the subframe. For example, in the subframe shown in FIG. 27B, A/N symbols 0 and 1 and DL symbol 2-5 are included.

The numerology of A/N symbols and the numerology (here, symbol length, subcarrier spacing) of DL symbols in the subframe may be different or may be the same as shown in FIG. 27B. If the numerologies are different, between the A/N symbol and the DL symbol, a symbol for switching the numerology may be provided.

In the present embodiment, in FIGS. 6, 8 to 10, FIGS. 13 to 20, as shown in FIG. 27A, an example where the A/N subframe is provided separately from the DL subframe is described as an example. However, the present embodiment is not limited to this, FIGS. 6, 8 to 10, and 13 to 20 may be appropriately changed and applied to a configuration including A/N symbols and DL symbols in one subframe as shown in FIG. 27B.

Operation Example

Figure 20:
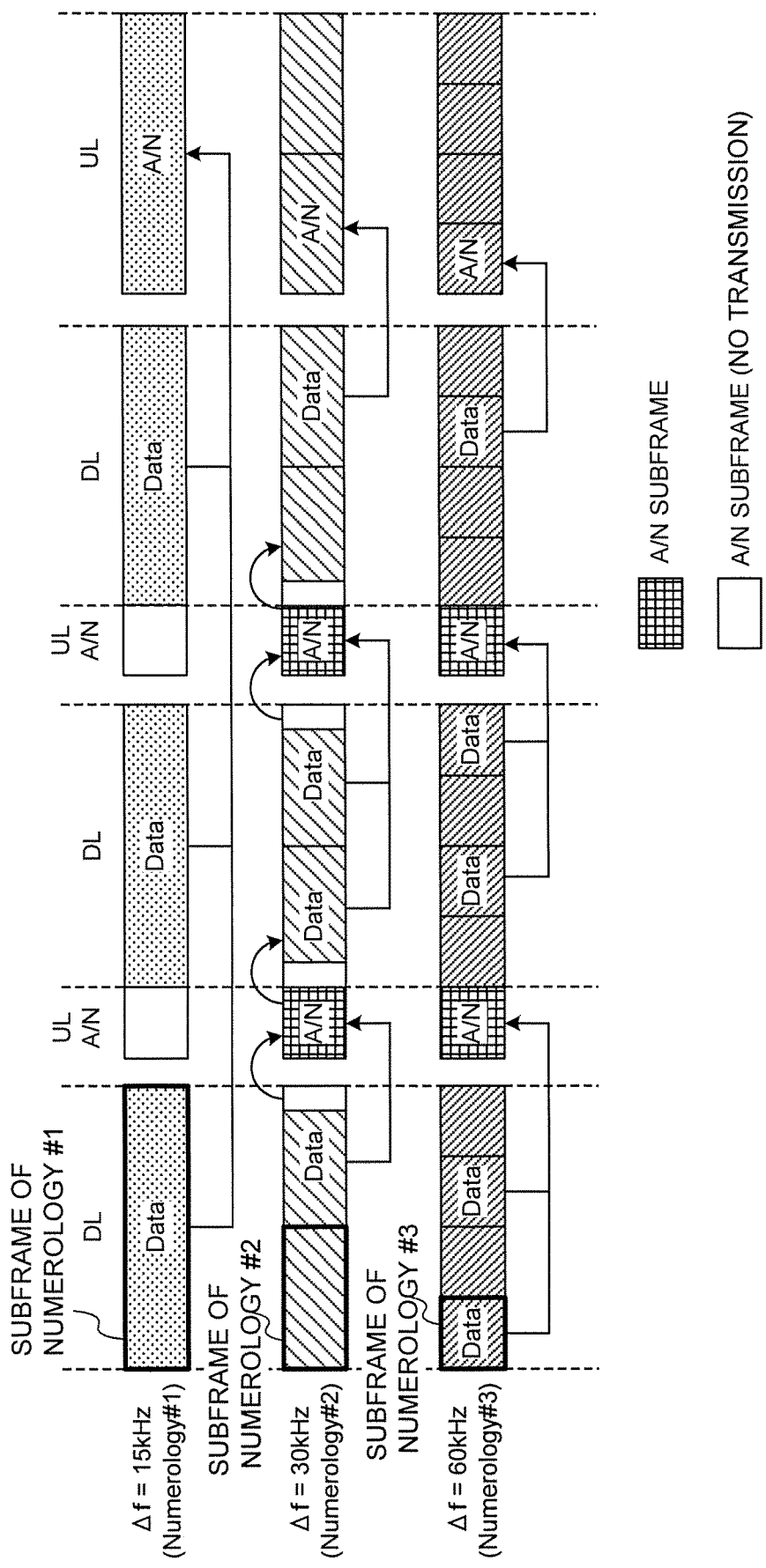
FIG. 20 is a diagram to show operation example of a radio communication system according to the present embodiment.

With reference to FIG. 20, an operation example in the radio communication system to which the frame configuration as described above is applied will be described. FIG. 27 is a diagram to show an example of a schematic structure of a radio communication system according to the present embodiment. In FIG. 20, it is assumed that the user terminals of numerologies #1, #2 and #3 are multiplexed in the same carrier as an example. Here, the numerology of the A/N subframe shall be configured to numerology #3.

Also, in FIG. 20, the radio frame structure described in FIG. 14 is assumed to be applied. Also, in FIG. 20, the latency requirement level of the user terminal of numerology #1 is low, and the latency requirement level of the user terminals of numerologies #2 and #3 is high. Also, in FIG. 20, in the case of transmitting the A/N of a plurality of DL signals in the A/N subframe, it is possible to use the configuration of A/N subframes described in FIG. 17 to FIG. 19 or existing PUCCH format 3.

For example, in FIG. 20, the numerology of a DL signal and the numerology of an A/N are different in the user terminal of numerology #1, and the latency requirement level is low. For this reason, the A/N of the DL signal in the first, second and third DL subframes from the left is transmitted in UL subframe of numerology #1. In this case, in the A/N subframe, the user terminal does not transmit and/or receive signals.

Also, in user terminals of numerology #2, the numerology of the DL signal and numerology of A/N are different, and the latency requirement level is high. For this reason, the A/N of the DL signal in the second DL subframe from the left is transmitted in the A/N subframe without waiting until the UL subframe of numerology #2. In the subframe of numerology #2 before and/or after the A/N subframe, the switching period and the TA period of numerology are configured. Note that the switching of numerology may be performed within the TA period without configuring the switching period.

Similarly, the A/N of the DL signal in the third and fourth DL subframes from the left of numerology #2 is also transmitted in the earliest A/N subframe. On the other hand, the A/N of the DL signal of the sixth DL subframe from the left is transmitted in the UL subframe, because there is an UL subframe of numerology #2 before the earliest A/N subframe.

Also, for numerology #3 user terminals, the numerology of the DL signal and the numerology of A/N are identical. For this reason, the A/N of the DL signal in the first and third DL subframes from the left is transmitted in the earliest A/N subframe. In this case, since it is not necessary to switch numerology, only the TA period needs to be provided.

Similarly, the A/N of the DL signal in the 6th and 8th DL subframes from the left of numerology #3 is transmitted in the earliest A/N subframe. Meanwhile, the A/N of the DL signal of the eleventh DL subframe from the left is transmitted in the UL subframe because there is UL subframe of numerology #3 before the earliest A/N subframe.

As described above, in the present embodiment, in order to reduce the latency, numerology (for example, #3 in FIG. 20) user terminal configured with a short subframe length (broad subcarrier spacing) can transmit the A/N of the DL signal in the A/N subframe without waiting until the next UL subframe. Therefore, the effect of the latency reduction can be effectively obtained.

(Radio Communication System)

Now, the structure of a radio communication system according to the present embodiment will be described below. In this radio communication system, each radio communication method according to the above-described embodiments is employed. Note that the radio communication method according to each embodiment may be used alone or may be used in combination.

Figure 21:
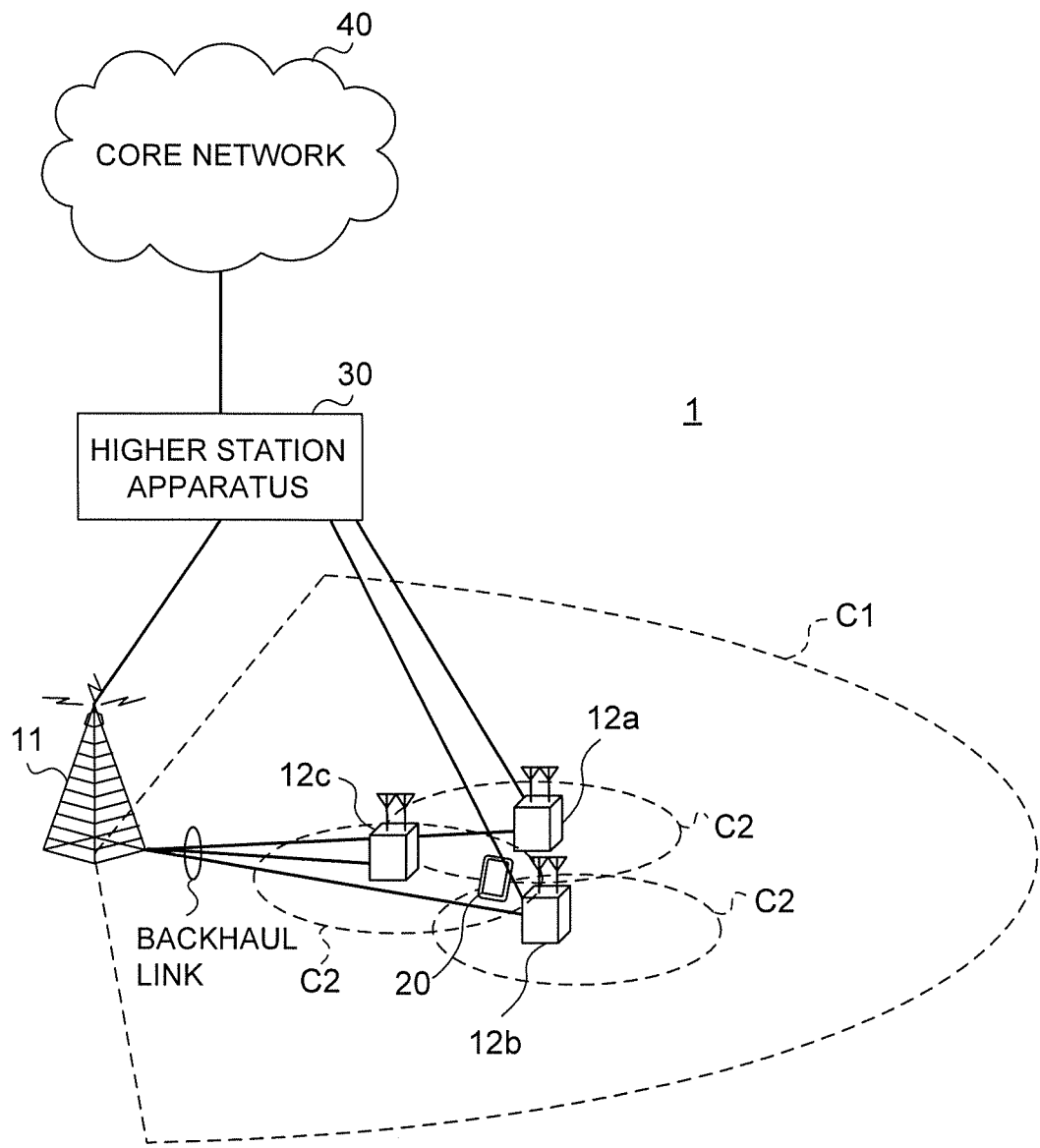
FIG. 21 is a diagram to show an example of a schematic structure of a radio communication system according to the present embodiment.

FIG. 21 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. The radio communication system 1 may be also referred to as "SUPER 3G," "LTE-A (LTE-Advanced)," "IMT-Advanced," "4G," "5G," "FRA (Future Radio Access)," "NR (New RAT: New Radio Access Technology)," and so on.

The radio communication system 1 shown in FIG. 21 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A configuration in which different numerologies are applied between cells may be adopted.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Furthermore, in each cell (carrier), a single numerology may be employed, or a plurality of different numerologies may be employed.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, DL data channel (PDSCH (Physical Downlink Shared CHannel), which is also referred to as, for example, a "DL shared channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Blocks) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. HARQ retransmission command information (ACK/NACK) in response to the PUSCH can be communicated using at least one of the PHICH, the PDCCH and the EPDCCH.

In the radio communication system 1, UL data channel (PUSCH (Physical Uplink Shared CHannel, which is also referred to as "UL shared channel" and so on)), which is used by each user terminal 20 on a shared basis, a UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of DL signal retransmission control information (A/N), channel state information (CSI) and so on, is communicated in the PUSCH or the PUCCH. By means of the PRACH, random access preambles for establishing connections with cells are communicated.

(Radio Base Station)

Figure 22:
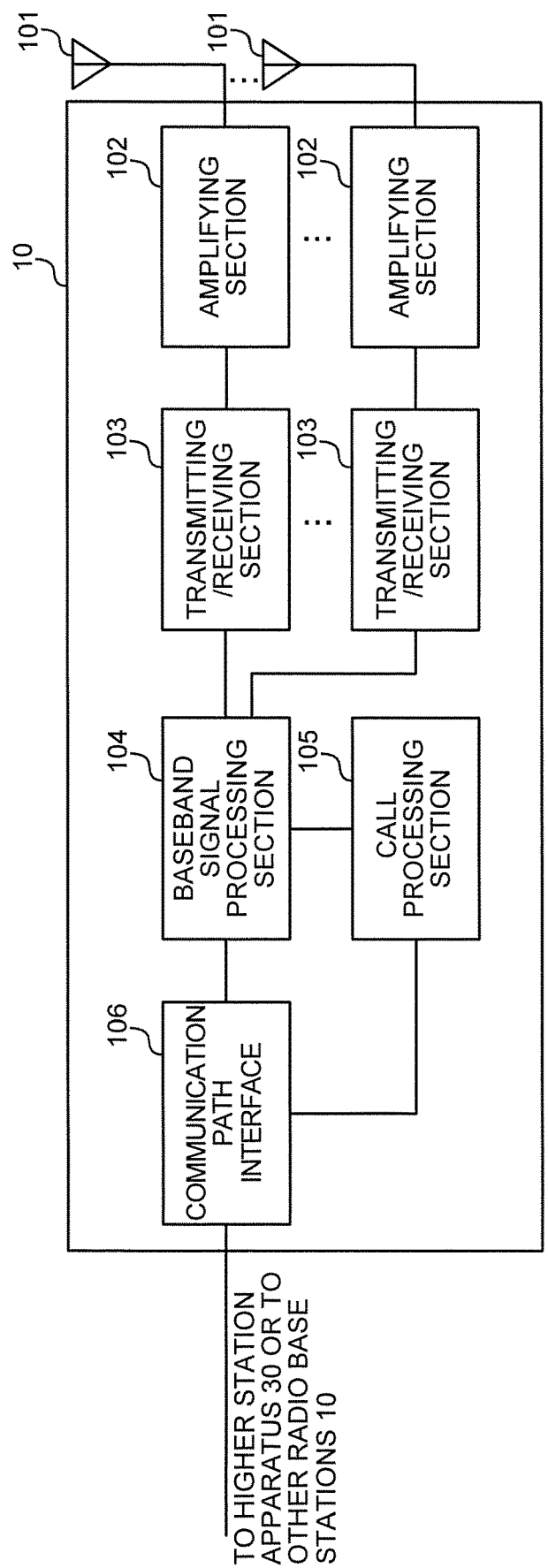
FIG. 22 is a diagram to show an example of an overall structure of a radio base station according to the present embodiment.

FIG. 22 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

Also, the transmitting/receiving sections 103 transmit DL signals (including DL data signal, DL control signal, DL reference signal, etc.) to a plurality of user terminals 20 that use different numerologies, and receive UL signals (including UL data signal, UL control signal, UL reference signal (for example, SRS, DMRS, etc.)) from these multiple user terminals 20.

In addition, the transmitting/receiving sections 103 receive A/Ns in response to DL signals and transmit A/Ns in response to UL signals. Also, the transmitting/receiving sections 103 may transmit A/N subframe configuration information. In addition, the transmitting/receiving sections 103 may transmit A/N resource allocation information. Also, the transmitting/receiving sections 103 may receive support information and/or latency requirement information.

Figure 23:
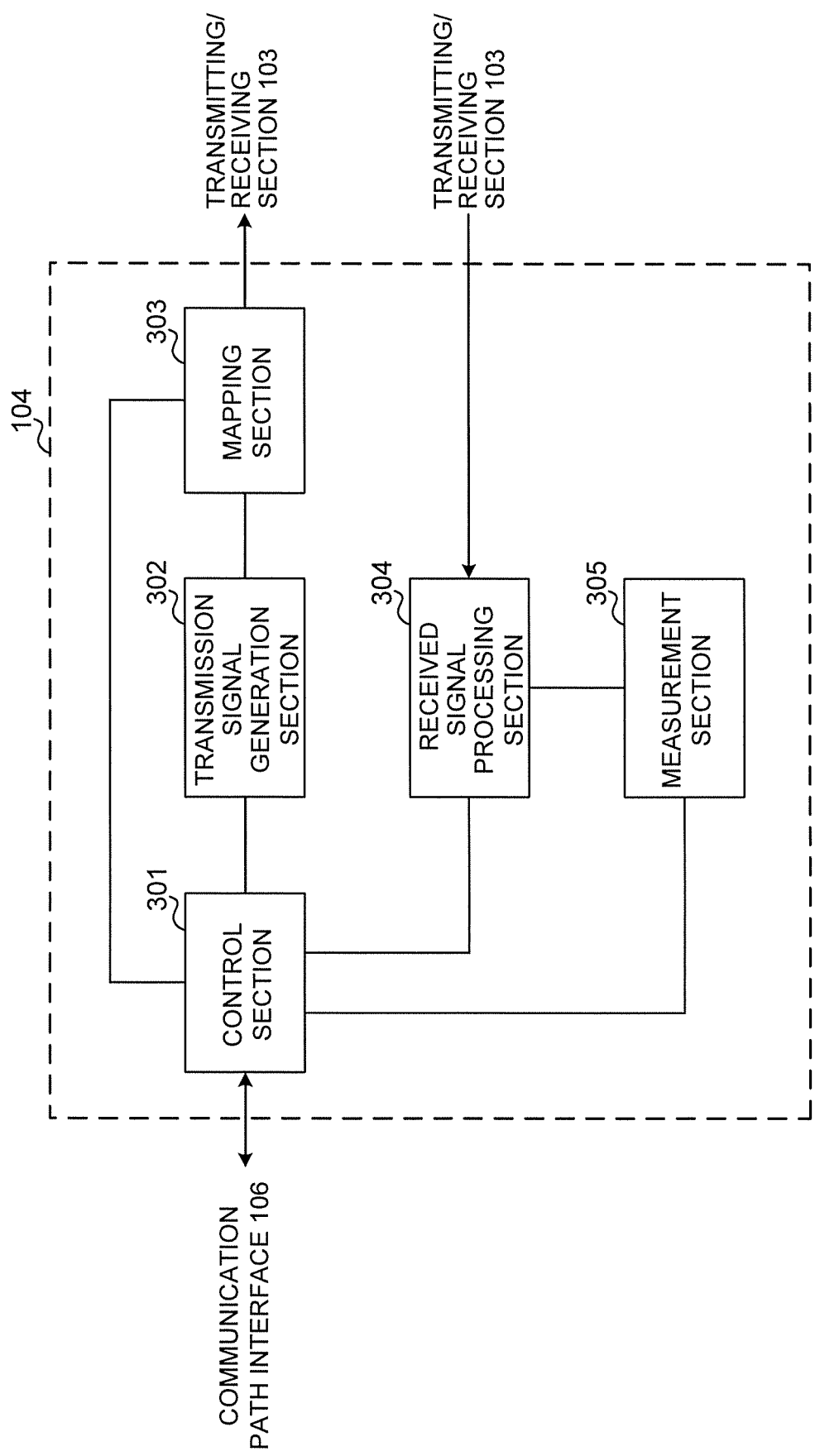
FIG. 23 is a diagram to show an example of a functional structure of a radio base station according to the present embodiment.

FIG. 23 is a diagram to show an example of a functional structure of a radio base station according to the present embodiment. Note that, although FIG. 23 primarily shows functional blocks that pertain to characteristic parts of the present embodiment, the radio base station 10 has other functional blocks that are necessary for radio communication as well. As shown in FIG. 23, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, the generation of DL signals by the transmission signal generation section 302, the mapping of DL signals by the mapping section 303, the receiving processes (for example, demodulation) for UL signals by the received signal processing section 304 and the measurements by the measurement section 305.

To be more specific, the control section 301 schedules a plurality of user terminals 20 that use different numerologies. For example, the control section 301 may multiplex DL signals and/or UL signals of these multiple user terminals 20 in the same carrier (cell, CC) by using at least one of frequency division multiplexing, time division multiplexing, code division multiplexing, space multiplexing, and power multiplexing.

These multiple user terminals 20 may be scheduled based on the channel quality measured in the measurement section 305, and this channel quality may be measured based on UL reference signals from these multiple user terminals 20. Furthermore, the scheduling may be performed based on support information and/or latency requirement information from each user terminal 20.

In addition, the control section 301 configures A/N subframes (retransmission control subframe) based on the same numerology among a plurality of user terminals 20 having different numerologies (see FIG. 6 and FIG. 20). To be more specific, the control section 301 may determine the numerology of this A/N subframe to be the numerology having the shortest subframe length among the numerologies of these multiple user terminals 20. This selection of the numerology may be made based on support information and/or latency requirement information (FIG. 7) from each user terminal 20.

In addition, the control section 301 may configure A/N subframes periodically or aperiodically at intervals longer than the subframe length between the numerologies of a plurality of user terminals 20 (FIGS. 6, 13 and 14). A/N subframes may be configured based on support information and/or latency requirement information from each user terminal 20 (FIG. 7).

In addition, the control section 301 controls switching of numerology (FIG. 8). To be more specific, when the numerology of a data subframe (a DL subframe and/or a UL subframe) and the numerology of an A/N subframe are different and an A/N is received in the A/N subframe, the control section 301 switches the numerology between the data subframe and the A/N subframe. Also, the control section 301 may stop receiving and/or transmitting in the last predetermined number of symbols of the data subframe immediately before the A/N subframe and/or the first predetermined number of symbols in the immediately following data subframe.

The control section 301 performs retransmission control of DL signal based on A/Ns from the user terminal 20. The control section 301 can be constituted by a controller, a control circuit or control apparatus that can be described based on general understanding of the technical field to which the present invention pertains.

The transmission signal generation section 302 generates DL signals (including DL data, scheduling information, A/N subframe configuration information, A/N resource allocation information) based on commands from control section 301 and outputs these signals to mapping section 303.

For the transmission signal generation section 302, a signal generator, a signal generation circuit or signal generation apparatus that can be described based on general understanding of the technical field to which the present invention pertains can be used.

The mapping section 303 maps the DL signals generated in the transmission signal generation section 302 to predetermined radio resources based on commands from the control section 301, and outputs these to the transmitting/receiving sections 103. For the mapping section 303, mapper, a mapping circuit or mapping apparatus that can be described based on general understanding of the technical field to which the present invention pertains can be used.

The received signal processing section 304 performs the receiving process (for example, demapping, demodulation, decoding and so on) of uplink signals that are transmitted from the user terminals 20. To be more specific, the received signal processing section 304 performs the UL signal receiving process based on the numerology configured in the user terminal 20. To be more specific, the received signal processing section 304 may output the received signals, the signals after the receiving process and so on, to the measurement section 305.

In addition, the received signal processing section 304 performs the receiving process of A/Ns in response to DL signals received in A/N subframes or UL subframes, and outputs ACKs or NACKs to the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 24:
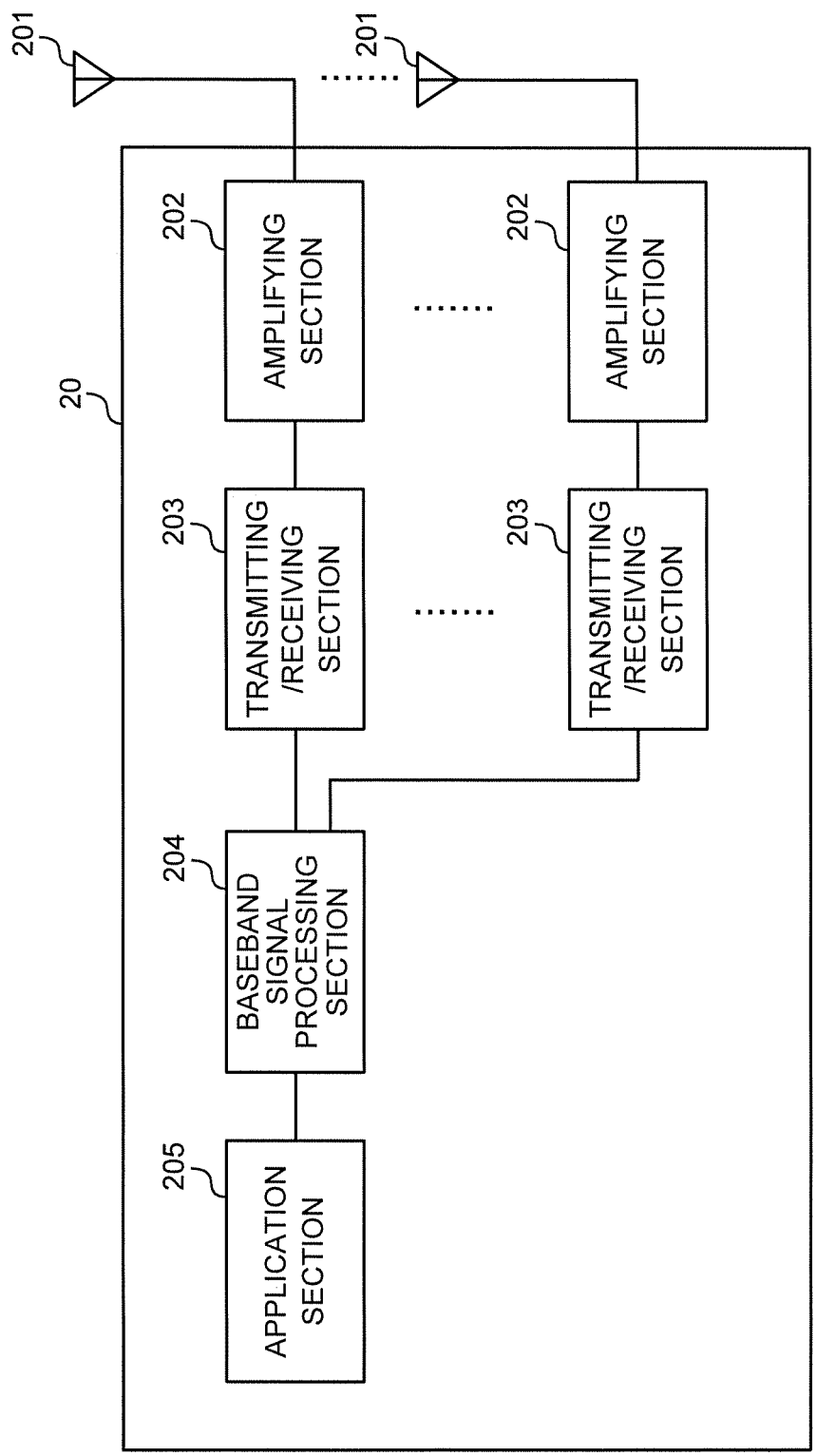
FIG. 24 is a diagram to show an example of an overall structure of a user terminal according to the present embodiment.

FIG. 24 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, the broadcast information is also forwarded to application section 205.

Meanwhile, the UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI (for example, DL retransmission control information, channel state information, etc.) is also subjected to channel encoding, rate matching, puncturing, DFT process, IFFT process, etc., and transferred to each transmitting/receiving section 203.

The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 receive the DL signals (including DL data signals, DL control signals, DL reference signals, etc.) of the numerology configured in the user terminal 20, and transmits the UL signals (including UL data signals, UL control signals, UL reference signals, etc.) of the numerology.

In addition, the transmitting/receiving sections 203 transmit A/Ns in response to DL signals and receive A/Ns in response to UL signals. Also, the transmitting/receiving sections 203 may receive A/N subframe configuration information. Also, the transmitting/receiving sections 203 may receive the A/N resource allocation information. Also, the transmitting/receiving sections 203 may transmit support information and/or latency requirement information.

For the transmitting/receiving sections 203, transmitters/receivers, transmitting/receiving circuits or transmitting/receiving apparatus that can be described based on general understanding of the technical field to which the present invention pertains can be used. Furthermore, a transmitting/receiving section 203 may be structured as one transmitting/receiving section, or may be formed with a transmitting section and a receiving section.

Figure 25:
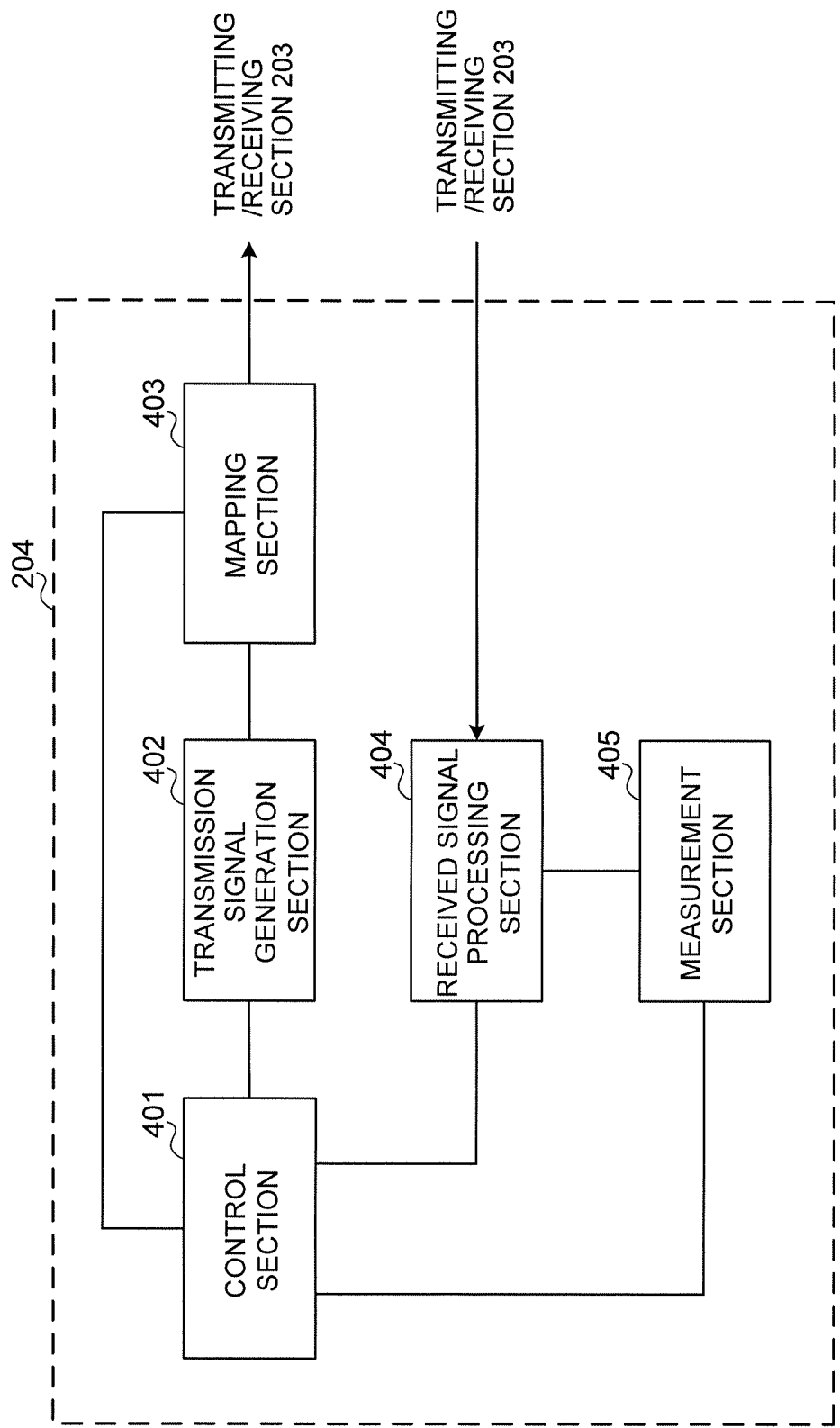
FIG. 25 is a diagram to show an example of a functional structure of a user terminal according to the present embodiment.

FIG. 25 is a diagram to show an example of a functional structure of a user terminal according to one embodiment of the present invention. Note that, although FIG. 25 primarily shows functional blocks that pertain to characteristic parts of the present embodiment, the user terminal 20 has other functional blocks that are necessary for radio communication as well. As shown in FIG. 25, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the UL signal receiving processes in the received signal processing section 404, the measurements in the measurement section 405 and so on.

In addition, the control section 401 configures A/N subframes (subframes for retransmission control) based on the same numerology among a plurality of user terminals 20 having different numerologies (FIG. 6 and FIG. 20). To be more specific, the control section 401 configures A/N subframes based on A/N subframe configuration information from the radio base station 10. The numerology of the A/N subframes may be the numerology with the shortest subframe length among the numerologies of multiple user terminals 20.

Furthermore, the control section 401 may configure A/N subframes periodically or aperiodically at intervals longer than the subframe length between the numerologies of multiple user terminals 20 (see FIG. 6, FIG. 13 and FIG. 20). The locations where these A/N subframes are inserted are specified by at least one (for example, A/N subframe configuration information) of system information (for example, SIB or MIB), control information by higher layer signaling, and physical layer control information (for example, downlink control information (DCI)).

In addition, the control section 401 controls switching of numerologies (FIG. 8). To be more specific, when the numerology of a data subframe (DL subframe and/or UL subframe) and the numerology of an A/N subframe are different and the A/N subframe is used to transmit an A/N, the control section 401 switches numerology between data subframes and A/N subframes. Also, the control section 401 may stop receiving and/or transmitting in the last predetermined number of symbols in the data subframe immediately before an A/N subframe and/or the first predetermined number of symbols of the immediately following data subframe.

If the numerology of a DL signal and the numerology of an A/N subframe are equal, the control section 401 controls so as to transmit an A/N in the A/N subframe (FIG. 9). For example, the control section 401 may control the transmission signal generation section 402, the mapping section 403, and the transmitting/receiving section 203 to transmit the A/N in the next (for example, the earliest) A/N subframe without switching the numerology.

Also, if the numerology of DL signals is different from the numerology of A/N subframes, the control section 401 control transmission of A/Ns in A/N subframes based on the latency requirement level (FIG. 10).

For example, when the latency requirement level of the user terminal 20 is high, the control section 401 may control the transmission signal generation section 402, the mapping section 403 and the transmitting/receiving section 203 to switch the numerology and transmit an A/N in the next (for example, the earliest) A/N subframe (FIG. 10A). Note that if there is a UL subframe before an A/N subframe, the control section 401 may exert control so that an A/N is transmitted in the UL subframe (see the A/N of the eleventh DL subframe from the left in FIG. 20).

On the other hand, when the latency requirement level of the user terminal 20 is low, the control section 401 may control the transmission signal generation section 402, the mapping section 403 and the transmitting/receiving section 203 to transmit an A/N in the next (for example, the earliest) UL subframe without switching the numerology (FIG. 10B).

The control section 401 performs retransmission control of UL signals based on A/Ns from the radio base station 10. For the control section 401, a controller, a control circuit or control apparatus that can be described based on general understanding of the technical field to which the present invention pertains can be used.

In the transmission signal generation section 402, UL signals (including UL data signal, UL control signal, UL reference signal, UCI, etc.) are generated (including, for example, encoding, rate matching, puncturing, modulation, etc.) based on commands from the control section 401, and output to the mapping section 403. For the transmission signal generation section 402, a signal generator, a signal generation circuit or signal generation apparatus that can be described based on general understanding of the technical field to which the present invention pertains can be used.

The mapping section 403 maps the UL signals generated in the transmission signal generation section 402 to radio resources based on commands from the control section 401, and output the result to the transmitting/receiving sections 203. For the mapping section 403, a mapper, a mapping circuit or mapping apparatus that can be described based on general understanding of the technical field to which the present invention pertains can be used.

The received signal processing section 404 performs the receiving process (for example, demapping, demodulation, decoding, etc.) of DL signals (DL data signal, scheduling information, DL control signal, DL reference signal, A/N subframe configuration information, A/N resource information). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 26:
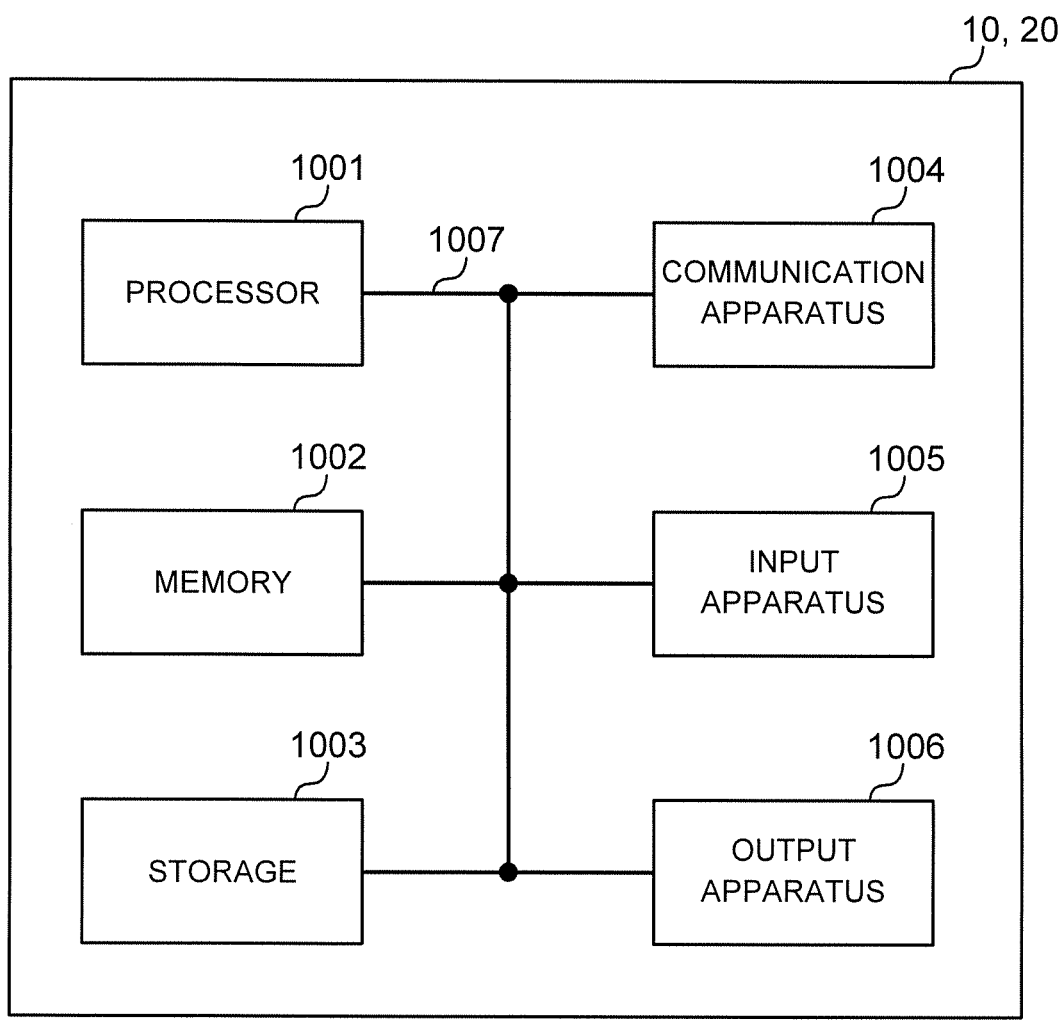
FIG. 26 is a diagram to show an example hardware structure of a radio base station and a user terminal according to the present embodiment.

That is, a radio base station, a user terminal and so on according to an embodiment of the present invention may function as a computer that executes the processes of the radio communication method of the present invention. FIG. 26 is a diagram to show an example of a hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval" (TTI), or a plurality of consecutive subframes may be referred to as a "TTI," or one slot may be referred to as a "TTI." That is, a subframe and a TTI may be a subframe (one ms) in existing LTE, may be a shorter period than one ms (for example, one to thirteen symbols), or may be a longer period than one ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time length of one ms may be referred to as a "normal TTI" (TTI in LTE Rel. 8 to 12), a "long TTI," a "normal subframe," a "long subframe," and so on. A TII that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol length and the cyclic prefix (CP) length can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PDCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-127072, filed on Jun. 27, 2016, including the specification, drawings and abstract, is incorporated herein by reference in its entirety.

The invention claimed is:
1. A terminal comprising:
a receiving section that receives a downlink (DL) signal in a carrier in which a plurality of terminals with different numerologies are multiplexed;
a transmission section that transmits a retransmission control information of the DL signal; and a control section that configures a retransmission control subframe based on a same numerology among the plurality of terminals, and controls transmission of the retransmission control information in the retransmission control subframe, wherein when a numerology of the DL signal is different from the numerology of the retransmission control subframe, the control section is further configured to control transmission of the retransmission control information in the retransmission control subframe based on a latency requirement level, in a case of a highest latency requirement level, transmission of the retransmission control information is controlled to be in a next retransmission control subframe, and in a case of a lowest latency requirement level, the transmission of the retransmission control information is controlled to be within a subframe having a same numerology as the numerology of the DL signal without the retransmission control information being transmitted in the retransmission control subframe.

2. The terminal according to claim 1, wherein the numerology of the retransmission control subframe is a numerology in which a subframe length is shortest among the numerologies of the plurality of terminals.

3. The terminal according to claim 2, wherein the control section configures the retransmission control subframe periodically or aperiodically, at intervals longer than a longest subframe length among the numerologies of the plurality of terminals.

4. The terminal according to claim 2, wherein the transmission section transmits the retransmission control information in the retransmission control subframe when a numerology of the DL signal and the numerology of the retransmission control subframe are equal.

5. The terminal according to claim 1, wherein the control section configures the retransmission control subframe periodically or aperiodically, at intervals longer than a longest subframe length among the numerologies of the plurality of terminals.

6. The terminal according to claim 5, wherein the transmission section transmits the retransmission control information in the retransmission control subframe when a numerology of the DL signal and the numerology of the retransmission control subframe are equal.

7. The terminal according to claim 1, wherein the transmission section transmits the retransmission control information in the retransmission control subframe when a numerology of the DL signal and the numerology of the retransmission control subframe are equal.

8. A radio communication method for a terminal in a carrier in which a plurality of terminals with different numerologies are multiplexed, the radio communication method comprising:

receiving a downlink (DL) signal;

configuring a retransmission control subframe based on a same numerology among the plurality of terminals; and controlling transmission of a retransmission control information in the retransmission control subframe, wherein when a numerology of the DL signal is different from the numerology of the retransmission control subframe, the terminal is further configured to control transmission of the retransmission control information in the retransmission control subframe based on a latency requirement level, in a case of a highest latency requirement level, transmission of the retransmission control information is controlled to be in a next retransmission control subframe, and in a case of a lowest latency requirement level, the transmission of the retransmission control information is controlled to be within a subframe having a same numerology as the numerology of the DL signal without the retransmission control information being transmitted in the retransmission control subframe.

9. A base station comprising:

a transmission section that transmits a downlink (DL) signal in a carrier in which a plurality of terminals with different numerologies are multiplexed; and a receiving section that receives a retransmission control information of the DL signal, wherein a retransmission control subframe based on a same numerology among the plurality of terminals is configured, and transmission of the retransmission control information in the retransmission control subframe is controlled, when a numerology of the DL signal is different from the numerology of the retransmission control subframe, transmission of the retransmission control information in the retransmission control subframe is controlled based on a latency requirement level, in a case of a highest latency requirement level, transmission of the retransmission control information is controlled to be in a next retransmission control subframe, and in a case of a lowest latency requirement level, the transmission of the retransmission control information is controlled to be within a subframe having a same numerology as the numerology of the DL signal without the retransmission control information being transmitted in the retransmission control subframe.

* * * * *